United States Patent [19]
Abu-Amara et al.

[11] Patent Number: 5,870,396
[45] Date of Patent: Feb. 9, 1999

[54] OUTPUT QUEUEING IN A BROADBAND MULTI-MEDIA SATELLITE AND TERRESTRIAL COMMUNICATIONS NETWORK

[75] Inventors: Hosame Hassan Abu-Amara, Richardson; Venkat Kotamarti, Dallas, both of Tex.

[73] Assignee: Northern Telecom Limited, Montreal, Canada

[21] Appl. No.: 775,275

[22] Filed: Dec. 31, 1996

[51] Int. Cl.$^6$ .................................................. H04L 12/56
[52] U.S. Cl. .......................................................... 370/413
[58] Field of Search .................................. 370/412, 413, 370/415, 417, 428, 429, 395

[56] References Cited

U.S. PATENT DOCUMENTS

| | | | |
|---|---|---|---|
| 5,126,999 | 6/1992 | Munter et al. | 370/415 |
| 5,128,931 | 7/1992 | Yamanaka et al. | 370/415 |
| 5,689,505 | 11/1997 | Chiussi et al. | 370/388 |

OTHER PUBLICATIONS

Ahmadi, et al, *A Survey of Modern High–Performance Switching Techniques*, IEEE Journal on Selected Areas in Communications, vol. 7, No. 7, Sep. 1989, pp. 1091–1103.

Arthurs, et al, *HYPASS: An Optoelectronic Hybrid Packet Switching System*, IEEE Journal on Selected Areas in Communications, vol. 6, No. 9, Dec. 1988, pp. 1500–1510.

Chao, *a Novel Architecture for Queue Management in the ATM Network*, IEEE Journal on Selected Areas in Communications, vol. 9, No. 7, Sep. 1991, pp. 1110–1118.

Chen, et al, *High–Throughput Cell Scheduling for Broadband Switching Systems*, IEEE Journal on Selected Areas in Communications, vol. 9, No. 9, Dec. 1991, pp. 1510–1523.

Devault, et al, *The "Prelude" ATD Experiment: Assessments and Future Prospects*, IEEE Journal on Selected Areas in Communications, vol. 6, No. 9, Dec. 1988, pp. 1528–1537.

Eng. *A Photonic Knockout Switch for High–Speed Packet Networks*, IEEE Journal on Selected Areas in Communications, vol. 6, No. 7, Aug. 1988, pp. 1107–1116.

Giacopelli et al., *Sunshine: A High–Performance Self–Routing Broadband Packet Switch Architecture*, IEEE Journal on Selected Areas in Communications, vol. 9, No. 8, Oct. 1991, pp. 1289–1298.

Hluchyj et al., *Queueing in High–Performance Packet Switching*, IEEE Journal on Selected Areas in Communications, vol. 6, No. 9, Dec. 1988, pp. 1587–1597.

Hui, *Switching Integrated Broadband Services by Sort–Banyan Networks*, Proceedings of the IEEE, vol. 79, No. 2, Feb. 1991, pp. 145–154.

(List continued on next page.)

*Primary Examiner*—Min Jung
*Attorney, Agent, or Firm*—Andrew J. Dillon

[57] ABSTRACT

A switch that includes inputs for receiving cells connected to a first storage means for storing the cells received at the inputs. The first storage means includes a plurality of portions in which each portion is associated with an input. Additionally, each portion has a number of segments in which a cell may be stored. Additionally, the switch includes an address translation means for assigning a destination from a plurality of destinations to each cell received at the inputs. A second storage means is included in the switch. This second storage means has a number of sections in which each section is associated with a destination within the plurality of destinations and each section includes a number of segments. For each cell assigned a destination, the second storage means stores information identifying the location of the cell within the first storage means. This information is stored in a segment in the section associated with the destination assigned to the cell. A reading means is employed to transfer cells from the first storage means to their destinations by accessing each section within the second storage means to obtain information to identify the location of the cell in the first storage means that should be transferred to the destination associated with a particular section in the second storage means. The information within each section in the storage means is accessed in a first-in-first-out basis.

43 Claims, 23 Drawing Sheets

OTHER PUBLICATIONS

Karol et al, *Input Versus Output Queueing on a Space–Division Packet Switch*, IEEE Transactions on Communications, vol. COM–35, No. 12, Dec. 1987, pp. 1347–1356.

Lee, *A Modular Architecture for Very Large Packet Switches*, IEEE Transactions on Communications, vol. 38, No. 7, Jul. 1990, pp. 1097–1106.

Narasimha, *A Recursive Concentrator Structure with Applications to Self–Routing Switching Networks*, IEEE Transactions on Communications, vol. 42, No. 2/3/4, Feb./Mar./Apr. 1994, pp. 896–898.

Suzuki, et al, *Very High–Speed and High–Capacity Packet Switching for Broadband ISDN*, IEEE Journal on Selected Areas in Communications, vol. 6, No. 9, Dec. 1988, pp. 1556–1564.

| Buffer Schemes | Present Invention (fixed W) | Input Window (w = 10) | Input Queueing (w = 1) | Output Queueing (Speedup = N) | Unbuffered (P ≥ 0.88) | Cell Scheduling | SunShine, K = 1 (shared, M) |
|---|---|---|---|---|---|---|---|
| Maximum Throughput | 0.95 (W = 10) 0.98 (W = 20) | 0.90 | 0.586 | 1.0 | 0.632 | .095 | 0.99 |
| When P = 0.85 Needed buffer size to reach loss ≤ $10^{-6}$ | 9N | 150N | infinite | 37N | no | 70N | M = 3N |
| Max. Hardware Estimate | W*N + $C_{controll}$ | Infinite queue + $C_{controll}$ | Infinite queue size | Infinite + $C_{speedup}$ | no buffer needed | Infinite + $C_{controll}$ | Enlarge Batcher Sorter size to N+M |

Fig. 22

OUTPUT QUEUEING IN A BROADBAND MULTI-MEDIA SATELLITE AND TERRESTRIAL COMMUNICATIONS NETWORK

BACKGROUND OF THE INVENTION

1. Technical Field

The present invention relates generally to a communication systems and in particular to a method and apparatus for routing data within the communications system. Still more particularly, the present invention relates to a switching system employed for routing cells from a source to a destination in a communications system.

2. Description of the Related Art

Factors driving the need for broadband communications arise from changing user needs and demands. Previously, public network needs were driven by telephoning, voice data. Data traffic has grown slowly until recently. With the lower cost in telecommunications and the higher increase in processing power of computers, the numbers of users accessing communications networks has increased. The needs of these users include, for example, video telephone, low cost video conferencing, imaging, high definition television (HDTV), and other applications requiring multimedia data transfers. Multimedia combines different forms of media in the communication of information between a user and a data processing system, such as a personal computer. A multimedia application is an application that uses different forms of communications within a single application. Multimedia applications may, for example, communicate data to a user on a computer via audio, text, and video simultaneously. Such multimedia applications are usually bit intensive, real time, and very demanding on communications networks. A number of definitions have been given for broadband service. One example is the International Telecommunications Union (ITU, formerly known as CCITT), which defines broadband service as a service requiring transmission channels capable of supporting rates greater than 1.5 Mbps or a primary rate in ISDN or T1 or DS1 in digital terminology. A broadband integrated services digital network (BISDN) technology framework involves asynchronous transfer mode (ATM) as a protocol for coordinating information flow at a source and destination node. For terrestrial networks, synchronous optical network (SONET), a standard for fiber optical transmission mediums form the backbone technology for BISDN. More information on broadband communications can be found in Kumar, *Broadband Communications: A Professional's Guide to (ATM) Frame Relay, SMDS, SONET, and BISDN*, McGraw-Hill, Inc., New York, (1995).

The progress in fiber optic and network technologies have made BISDN a commercial reality and has made possible sophisticated computer applications, such as the transmission of video, voice, and other data over computer networks. ATM is the most common switching technique used by broadband networks to integrate a variety of multirate services, ranging from high speed video services and computer communications to low speed voice services, into a single high speed network. Currently, the ATM standard defined by ITU specifies fixed packet sizes (cells) consisting of 5 bytes in a control field and 48 bytes in a data field and supports line speeds of up to 150 Mbps, 600 Mbps, or above. ATM networks are packet-oriented, in which information is packetized, carried in fixed length packets, and transmitted in a slot by slot fashion. Most integrated services provided by BISDN falls into two major categories. In the first category, circuit emulation type, also called connection oriented, requires reserving the bandwidth for the whole duration of the connection because extremely low cell loss rates, such as less than 1e-1, is crucial. In the second category, the connectionless type, the bandwidth requirement is unpredictable and bursty, such as in intercomputer data communication, but a certain degree of cell loss is tolerable, such as less than 1e-6. In networks that provide both types of services, it is very common and desirable to assign higher priority to the cells of connection-oriented services than to the cells of connectionless services.

To meet high speed transmission demands, ATM employs a hardware-based fast packet switching technique that allows cells to be self-routed from input ports through an interconnection network to output ports by using the destination information stored in cell headers. Carrying large amounts of information over long distances with the help of high bandwidth satellites or fiber optics is straight forward, but the switching of high-speed packet flows is a challenging task.

The design of BISDN and ATM switches is made more difficult by the requirement that customer expectations be met and the network be used efficiently. One way to satisfy customer expectations is for the switches to ensure that the quality of service (QoS) parameter values for the multimedia services are not exceeded. A further complication of switch design is that the switches are required to have a high degree of fault-tolerance. Modern satellite systems, such as Teledesic and Advanced Satcom, have ATM switches on board the satellites. ATM networks and these types of satellites carry a large volume of integrated multimedia traffic. As a result, a failure in the switches can be catastrophic for a large number of users. Additionally, networks including satellite switches impose other complications on switch design. If the ATM switch is to be implemented on board the satellite, then the ATM switch must be as small as possible and must be implemented in technologies that consume as little power as possible.

Output conflicts and internal conflicts are two kinds of conflicts that may occur within a switching system. When several cells attempt to reach the same output at the same time, an output conflict occurs. On the other hand, an internal conflict occurs whenever two or more cells simultaneously try to use the same internal link in the communications network. Output and internal conflicts cause cells to be discarded.

Several buffer schemes have been proposed to reduce the conflicts and maintain packet loss within a desired range. These buffer schemes can be classified into three categories: input queueing, central queueing, and output queueing. For a network of size N, if the switch fabric can run N times as fast as the input and output links (i.e., with a speed-up factor of "N"), all of the arriving cells in the current time slot can be routed to their destinations before the next time slot. Thus, in the worst case, even if all the N incoming cells may request the same output, only output queues are needed. On the other hand, if a switch fabric can run only as fast as the input and output links, then only one cell per output is allowed during the time slot, and input queues are required to store the rest of the cells addressed for the same output.

Buffers are usually required in the switch elements of the switch fabric to resolve internal link usage conflicts. A Banyan switch, also called a "single path switching matrix", is a blocking network and requires internal buffers, but can become nonblocking if the incoming cells have been pre-sorted by a batcher sorting network. Input queueing suffers from low-performance and internal queueing, also called central queueing, requires expensive and fast internal links within a switch. Output queueing has the best performance among the three, but requires the highest hardware complexity of the schemes.

Space switching has the merit of allowing high speed operation and is most appropriate for BISDN and ATM networks. According to hardware complexity, space switching can be further divided into four subcategories. (a) $N^2$ disjoint path switching, (b) crossbar switching, (c) Banyan-based switching, and (d) shared-memory switching. Switches in the first three categories have large switch sizes and are expensive. Additionally, the performance varies with the network size.

With respect to shared memory switching, shared memory buffer management schemes, as mentioned above, includes input queueing, central queueing, and output queueing. Among all buffer management schemes, the simplest scheme is input queueing with first-and-first-out (FIFO) discipline. Head-of-line (HOL) blocking, reduces the maximum output in this queueing system. HOL blocking may exist in FIFO queues in input portions of switches. HOL blocking can reduce the throughput of switches because once the front cell in an input queue loses the contention for an output port, the cell will remain in the input queue and wait for a retry in the next time slot. Thus, the cell blocks other cells in the queue from being served even though their destination outputs may be idled. Several input queueing schemes employ a window service mechanism. Under this mechanism, those input links of these first cells do not win the output contentions can have their second cells contend for access to any idol output port. This procedure is repeated for the first W cells (window size) of each queue. The window size approach requires very complicated control hardware, but still only allows one cell from an input queue in a time slot to access the output ports. Thus, the resulting performance/cost ratio is poor.

In central queueing, a switch can run N times as fast as the input and output links (i.e., with a speed up factor of N) so that all the arriving cells in the current time slot can be routed to the destinations before the next time slot. Existing output queueing switches presently available require a large amount of hardware, have a large end to end delay, do not tolerate faults, or require expensive implementation technology.

Thus, it would be advantageous to have an approved switch for routing cells without the drawbacks mentioned for the various shared memory buffer management schemes described above. It would be advantageous to have an ATM switch that satisfies quality of standard requirements for various multi-media services but with smaller hardware cost than comparable existing ATM switches. It would also be advantageous if such a switch could be implemented using inexpensive technology consuming little power, scalable to handling various amount of traffic, and performance that is insensitive to the communications network size.

SUMMARY OF THE INVENTION

The present invention provides a switch that includes inputs for receiving cells connected to a first storage means for storing the cells received at the inputs. The first storage means includes a plurality of portions in which each portion is associated with an input. Additionally, each portion has a number of segments in which a cell may be stored. Additionally, the switch includes an address translation means for assigning a destination from a plurality of destinations to each cell received at the inputs. A second storage means is included in the switch. This second storage means has a number of sections in which each section is associated with a destination within the plurality of destinations and each section includes a number of segments. For each cell assigned a destination, the second storage means stores information identifying the location of the cell within the first storage means. This information is stored in the second storage means in a segment in the section associated with the destination assigned to the cell. A reading means is employed to transfer cells from the first storage means to their destinations by accessing each section within the second storage means to obtain information to identify the location of the cell in the first storage means that should be transferred to the destination associated with a particular section in the second storage means. The information within each section in the storage means is accessed in a first-in-first-out basis.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 22 a table illustrating a comparison of a switch according to the present invention with other known switching architectures.

DETAILED DESCRIPTION

I. Environment

Figure 1:
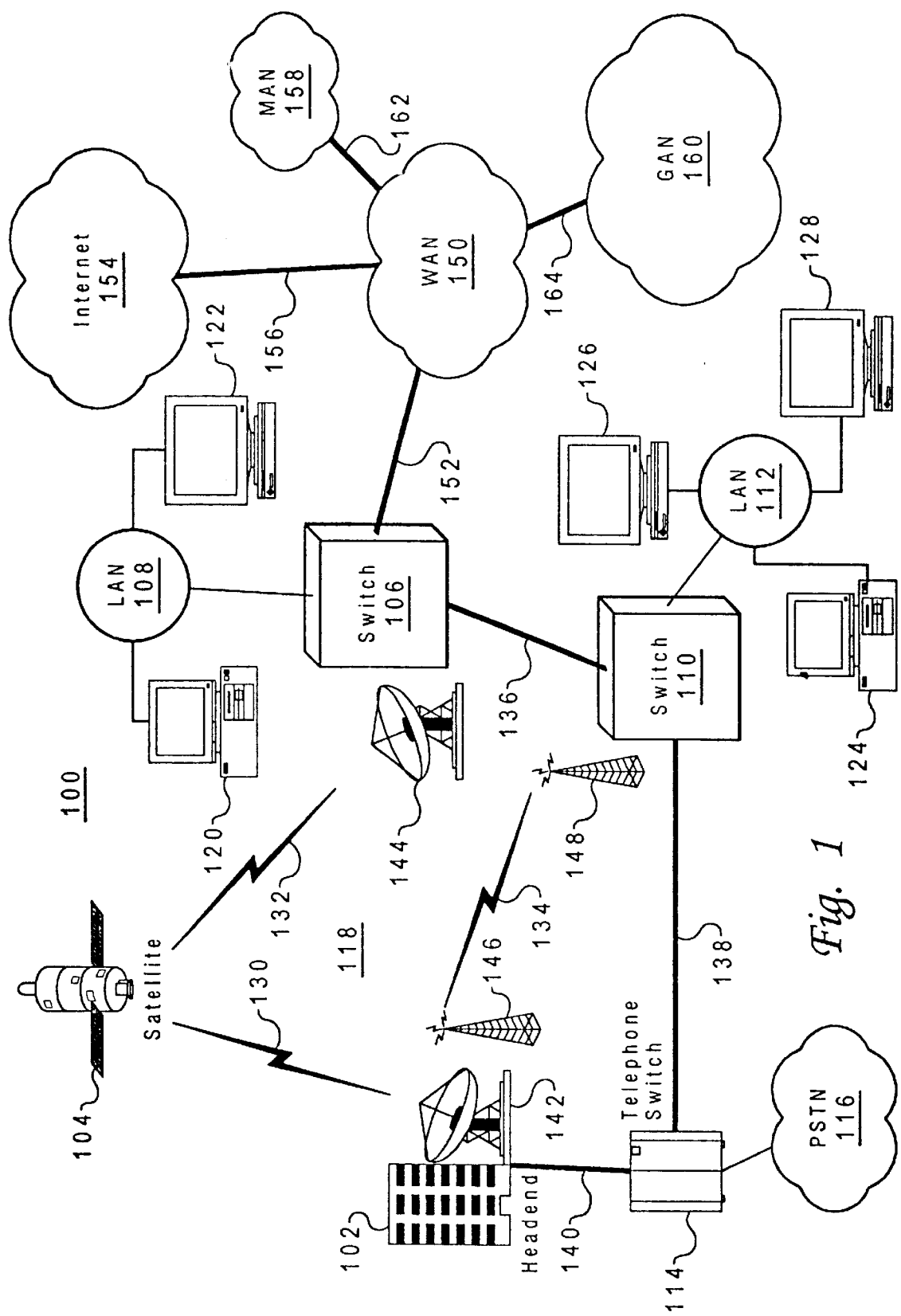
FIG. 1 depicts a diagram of a communications system according to the present invention.

With reference now to the figures, and in particular with reference to FIG. 1, a diagram of a communications system 100 is depicted according to the present invention. In particular, the present invention may be implemented in the various switches depicted in communication system 100. Headend 102; satellite switch 104; switch 106, which is a terrestrial switch connected to local area network (LAN) 108; switch 110 connected to LAN 112; and telephone switch 114 connected to public switch telephone network (PSTN) 116 form a wide area network (WAN) 118. LAN 108 includes computers, such as computers 120 and 122. LAN 112 also includes computers 124, 126, and 128. Users of these computers may send information to and from each other or to other users (not shown) within WAN 118 via communications links 130, 132, 134, 136, 138, and 140. Communications link 130 is a radio frequency based link in which the data signal is transmitted from satellite dish 142 at headend 102 to satellite switch 104. Communications link 132 is a radio frequency based link, generated by signals sent from satellite switch 104 to satellite dish 144, which is associated with switch 106. In this manner, data signals, such as multimedia data, which may include video, graphics, voice, and text, may be sent from headend 102 to a computer such as computer 120 in LAN 108. Satellite dish 144 may transmit data signals through communications link 132 to satellite switch 104 and through communications link 130 to satellite dish 142 for reception at headend 102.

Communications link 134 is a radio frequency communications link generated between radio tower 146, associated with headend 102 and radio tower 148, associated with switch 110. Switch 106, switch 110, telephone switch 114, and headend 102 are connected to each other via communications links 136, 138, and 140, which are physical links, such as, for example, coaxial cable, fiber optic cable, or a combination of the two. Each switch has a "link", also called a "path", within the switch for routing data through the switch. An "input link" is the input or source portion of the link associated with an input into the switch, and an "output link" is the output or destination portion of the link associated with an output from the switch.

Data may be sent through a number of different paths using various communications links and switching within WAN 118. For example, a user at computer 124 may send information to a user in public switched telephone network (PSTN) 116 through communications link 138. Alternatively, information may reach the user in PSTN 116 from computer 124 by sending data through a path starting with communications link 136 to communications link 132, to communications link 130, and then to communications link 140 to reach the user within PSTN 116. The various switches in WAN 118 direct traffic between other switches to facilitate flow of information within this network. Although the depicted examples show data transfers between computers, data also may be transferred between other communication devices (not shown) within communications system 100.

WAN 118 is connected to other networks, such as WAN 150 through a communications link 152 connected to switch 106. A WAN is typically designed to interconnect computer systems over large geographic scopes, such as from one city to another city within a country. Typically, a WAN may range from 100 KM to 1000 KM in the speed between the cities can range from 1.5 Mpbs to 2.4 Gpbs. Communications system 100 also includes a connection from WAN 150 to internet 154 through communications link 156. Additionally, other types of networks such as metropolitan area network (MAN) 158 and global area network (GAN) 160 through communications links 162 and 164, respectively. Metropolitan area networks typically cover a metropolitan city and interconnects a number of different LANs located in different buildings. A global area network provides connections between countries around the globe. An example of such a network is internet 154. Data is transferred to and from these various networks and to communications systems and devices within the networks using switches, such as those depicted for WAN 118. The switching system of the present invention is implemented in a satellite switch, such as satellite switch 104 according to a preferred embodiment of the present invention. The present invention also may be implemented in switches other than satellite switches.

II. Switch Architecture

Figure 2:
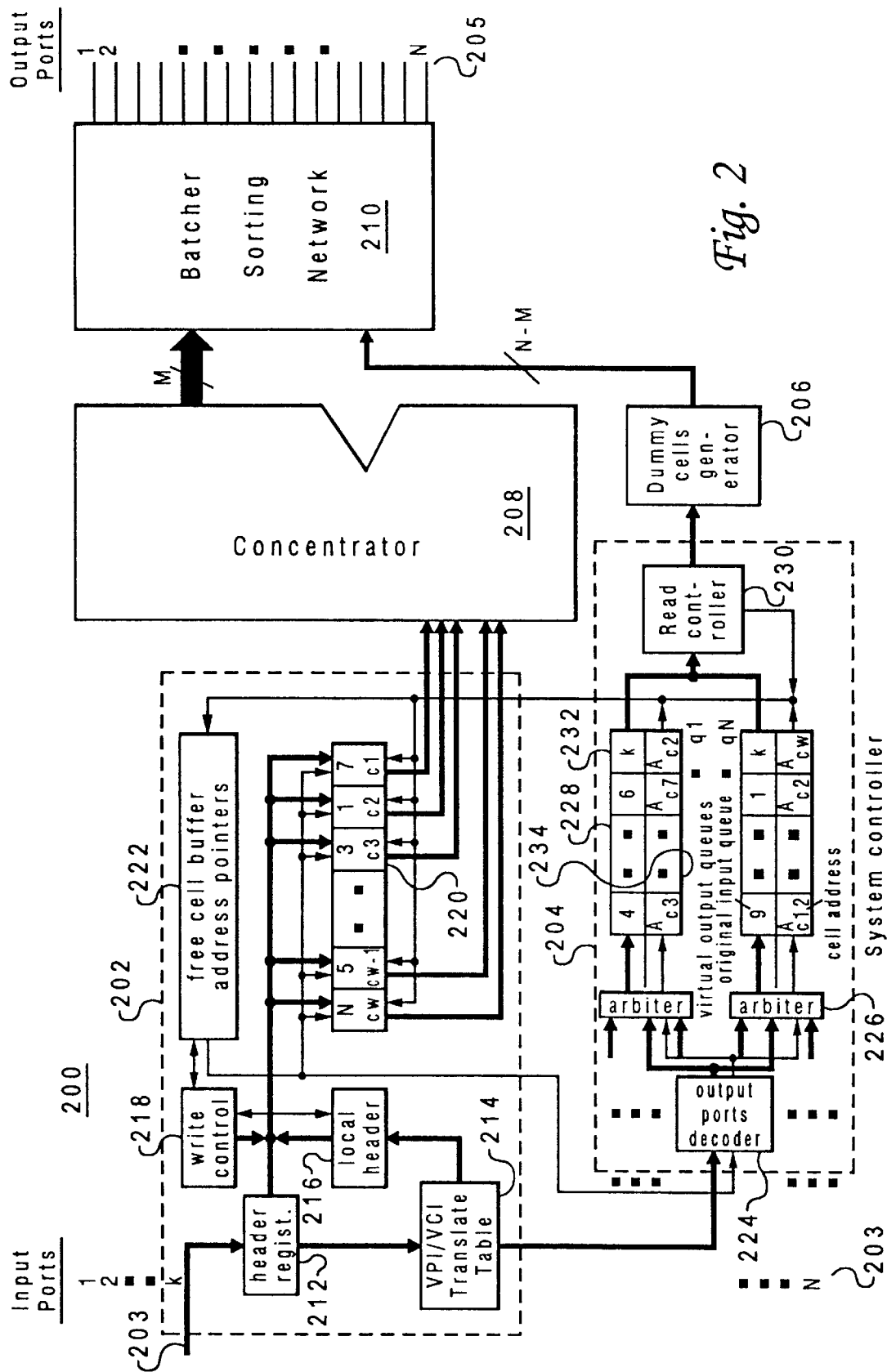
FIG. 2 is a block diagram of a switch is depicted according to the present invention.

With reference now to FIG. 2, a block diagram of a switch unit is depicted according to the present invention. One or more switch units may be used in the switches depicted in FIG. 1. In the depicted example, switch 200 includes N input ports 203 and N output ports 205. Switch unit 200 includes, for each input port 203, a port unit 202, a system controller 204, a dummy cell generator 206, a concentrator 208, and a batcher sorting network 210. Each input port 203 is connected to a port unit 202. In other words, switch 200 includes N port units 202 in accordance with a preferred embodiment of the present invention. Only a single controller 204 is employed with port units 202 in the depicted example. Each input port 203 is associated with an input port unit number (i.e., 1 to N) and each output port is assigned an output port number, also called a destination, (i.e., 1 to N). Port unit 202 also includes a header parser register 212, a VPI/VCI translation table 214, a local header generator 216, a write control unit 218, an input queue 220, and free cell buffer address pointer unit 222. Free cell buffer address pointer unit 222, contains a pool of free cell buffer address pointers. Input queue 220 is a buffer memory that has room to hold up to W cells in which W is a design parameter that is chosen by the switch builder. Individual dedicated links to concentrator 208 are present in input queue 220, allowing for all cells in input queue 220 to be read or transferred to concentrator 208.

System controller 204 includes output decoders 224, arbitrators 226, virtual output queues 228, and read controller unit 230. An output decoder 224 is employed for each input port 203. N virtual output queues 228 are present each with associated arbitrators 226. Each virtual output queue 228 consists of two subqueues: an original input port number subqueue 232 and a cell address subqueue 234. Additionally, each virtual output queue 228 is associated with an output port 205.

Concentrator 208 is a W×N:N concentrator, which is a concentrator that has W×N inputs and N outputs. W is the number of cells that each input queue 220 can hold. More information on concentrators may be found in M. J. Narasimha, *A Recursive Concentrator Structure with Applications to Self-Routing Switching,* IEEE Trans. Commun., Vol. 42, pp. 896–898, No. 2/3/4, February 1994. More information on batcher sorting networks, such as batcher sorting network 210 may be found in J. Hui, *Switching Integrated Broadband Services by Sort-Banyan Networks,* Proc. IEEE, Vol. 79, pp. 145–154, February 1991.

Figure 3A:
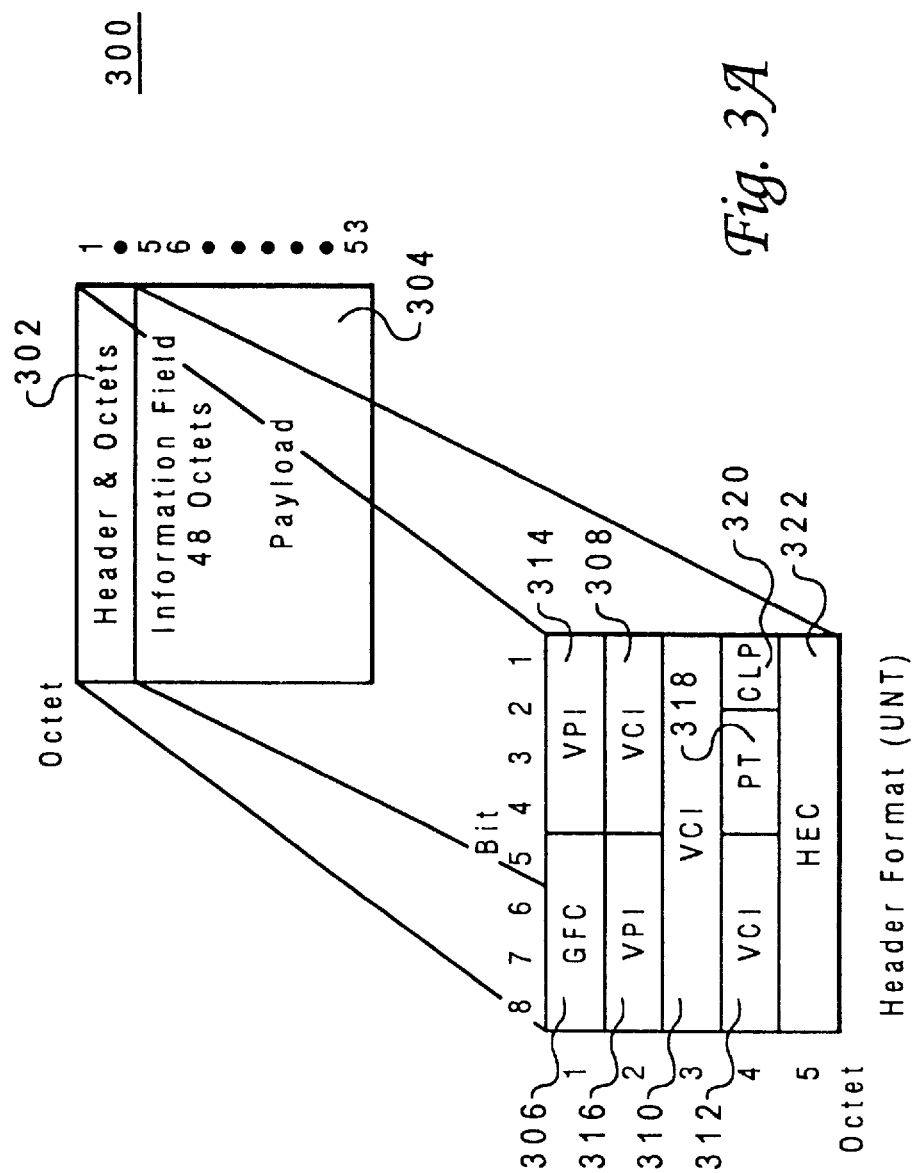
FIG. 3A depicts a diagram of an ATM cell that may be routed through a switch illustrated according to the present invention.

A diagram of an ATM cell that may be routed through switch 200 is illustrated in FIG. 3A in accordance with a preferred embodiment of the present invention. ATM cell 300 is a 53 byte packet having a header 302 and a payload 304 in which header 302 is a 5 byte header and payload 304 is a 48 byte payload. Header 302 includes a generic flow control (GFC) field 306, which provides contention resolution and simple flow control for shared medium-access arrangements and is present in cells located between a user and a network. ATM cells located between different switches do not contain this field. Virtual channel identifier (VCI) fields 308, 310, and 312 are employed to establish connections using translation tables at switching nodes that map an incoming VCI to an outgoing VCI. The VCI field in the header of an ATM cell is typically 16 bits. Virtual path identifier (VPI) fields 314 and 316 are used to establish a virtual path connection for one or more logically equivalent VCIs in terms of route and service characteristics. VPI fields 314 and 316 are either 8 or 12 bits depending on the location of the ATM cell.

ATM cells between switches have 12 bits for the VPI while ATM cells traveling from a user to a network or switch have 8 bits. Payload type (PT) field 318 is a 3 bit field employed to differentiate cells traversing the same virtual circuit and can contain various operation, administration, and maintenance information or user information. Cell loss priority (CLP) field 320 is a 1 bit field employed to explicitly indicate cells of lower priority by setting the field to a "1". Header error control (HEC) field 322 is used to perform a cyclic redundancy check (CRC) calculation on the first 4 bytes of the header field for error detection and correction. More general information on ATM cells and switching systems can be found in Geralski, *Introduction to ATM Networking,* McGraw-Hill, Inc., (1995), ISBN 0-07-024043-4.

Figure 3B:
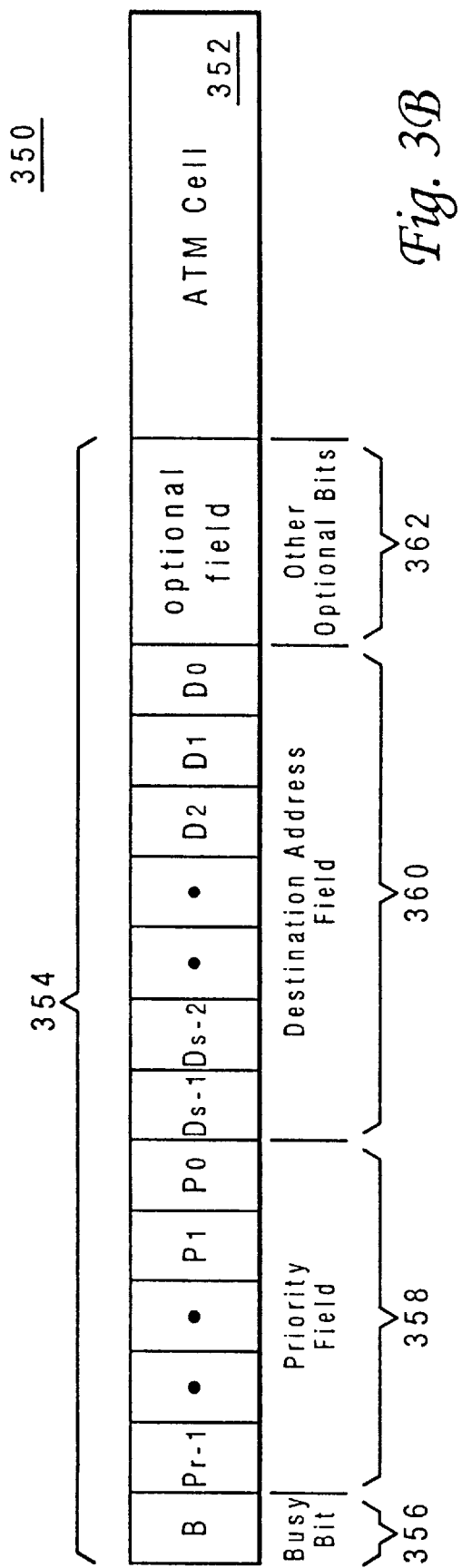
FIG. 3B depicts a block diagram of a cell that is routed through a switch illustrated according to the present invention.

Since ATM has the merit of high speed with minimal network latency, little information is located in a cell header. Local header generator 216 replaces the incoming VPI/VCI with new VPC/VCI and adding a destination port and along with (optional) local synchronization bits, error checking information, and network management data for higher layers. In FIG. 3B, a block diagram of a cell that is routed through switch 200 is depicted according to the present invention. Cell 350 includes an information field 352, which contains an ATM cell, such as ATM cell 300 as illustrated in FIG. 3A. Local header 354 contains a busy bit field 356, which indicates whether information exists in information field 352. Priority field 358 indicates the priority of the cell while destination address field 360 contains the destination (destination port) for cell 360. Optionally, other information may be stored in optional bits field 362. Local header 354 is removed at the output ports in batcher sorting network 210 to leave an ATM cell 300 prior to the cell leaving switch unit 200.

When a cell c arrives at an input port 203 in the depicted example, the cell's header is checked through header parser register 212 and replaced with the appropriate local header. Then, write control unit 218 obtains the address of a free block cell from free cell buffer address pointer unit 222 and stores cell c at the corresponding address in input queue 220. If input queue 220 is full, cell c will be discarded. Meanwhile, output port decoder 224 in system controller 204 sends the input port number, k, with the address of cell c to be stored in a virtual output queue 228 corresponding to the destination output link number for cell c. The input port number is stored in input port number subqueue 232 while the address is stored in cell address subqueue 234 within virtual output queue 228. Since only a few bytes are needed to store the input port number and cell address for a cell, each virtual output queue 228 can handle a large number of cells. For a particular output, the input queue number in input port number subqueue 232 tells the concentrator the input queue in which the cell is stored. The address $A_i$ in cell address subqueue 234 tells concentrator 208 where in a particular input queue 220 the cell is stored so that the cell may be transferred from that location in input queue 220 to the correct destination output port 205.

Read controller unit 230 is a crucial part of system controller 204. In every time slot, read controller unit 230 accesses all virtual output queues 228 to fetch the HOL input port numbers from the input port number subqueues 232 to form a transmitting control vector (then $<t_1, t_2, \ldots, t_N>$) and fetches the HOL cell addresses from cell address subqueues 234 within virtual output queues 228 to form a cell address vector $[(a_1,) (a_2,) \ldots (a_N)]$. A HOL input port number is the first input port number at the output of input port number subqueue 232. A HOL cell address is the first cell address at the output of cell address subqueues 234. The queues handle data on a first in, first out basis. When the HOL input port number and HOL cell address are retrieved from input port number subqueue 232 and cell address subqueue 234, respectively, the other input port numbers and cell addresses are shifted towards the output of the respective subqueues to become the HOL input port number and cell address.

When an element $t_i$ in the transmitting control vector is not empty, then a cell may be read out from an address $a_i$ in input queue $t_i$. The address $a_i$. becomes a free buffer address to be stored in the pool of free cell buffer address pointers in free cell buffer address pointer unit 222 corresponding to input link $t_i$ associated with an input port 203. In other words, input port number subqueues 232 and cell address subqueues 234 in virtual output queues 228 are accessed in a first in, first out method in determining which cells to transfer from input queue 220 to concentrator 208.

Each input queue 220 of size W cells has one write port and W read ports. As a result, every cell in an input queue 220 memory location can be read out through its own dedicated link and read port to access the rest of switching network in a time slot.

As can be seen in the depicted example, input queue 220 is a memory buffer that has W locations (i.e., C1–CW) to store cells from input port 203. Cells are stored one at a time into input queue 220. In contrast, one or more cells up to W cells may be transferred to concentrator 208 from input queue 220 in a single time slot.

W×N:N concentrator 208, under the control of read controller unit 230, reads out selected cells from input queues 220 in input ports 202. Since some virtual output queues 228 may be empty, the number M of selected cells may be less than N. Dummy cell generator 206 is employed to generate N-M dummy cells with distinct destinations for the unrequested N-M output ports 205. With the use of dummy cells, batcher sorting network 210 is sufficient to send all selected cells to their destinations successfully, eliminating the need for a routing network.

Any cell in an input queue 220 has a chance to be selected by system controller 204 through the cell's own dedicated link to be processed and routed to its destination in a particular time slot. It is possible to have multiple cells from the same input queue 220 accessing switching network (concentrator 208 and batcher sorting network 210) in a single time slot. Since each cell in an input queue 220 has its own dedicated link to concentrator 208, the size of input queue 220 should be kept small to decrease hardware complexity, but provide good saturated throughput.

Figure 4:
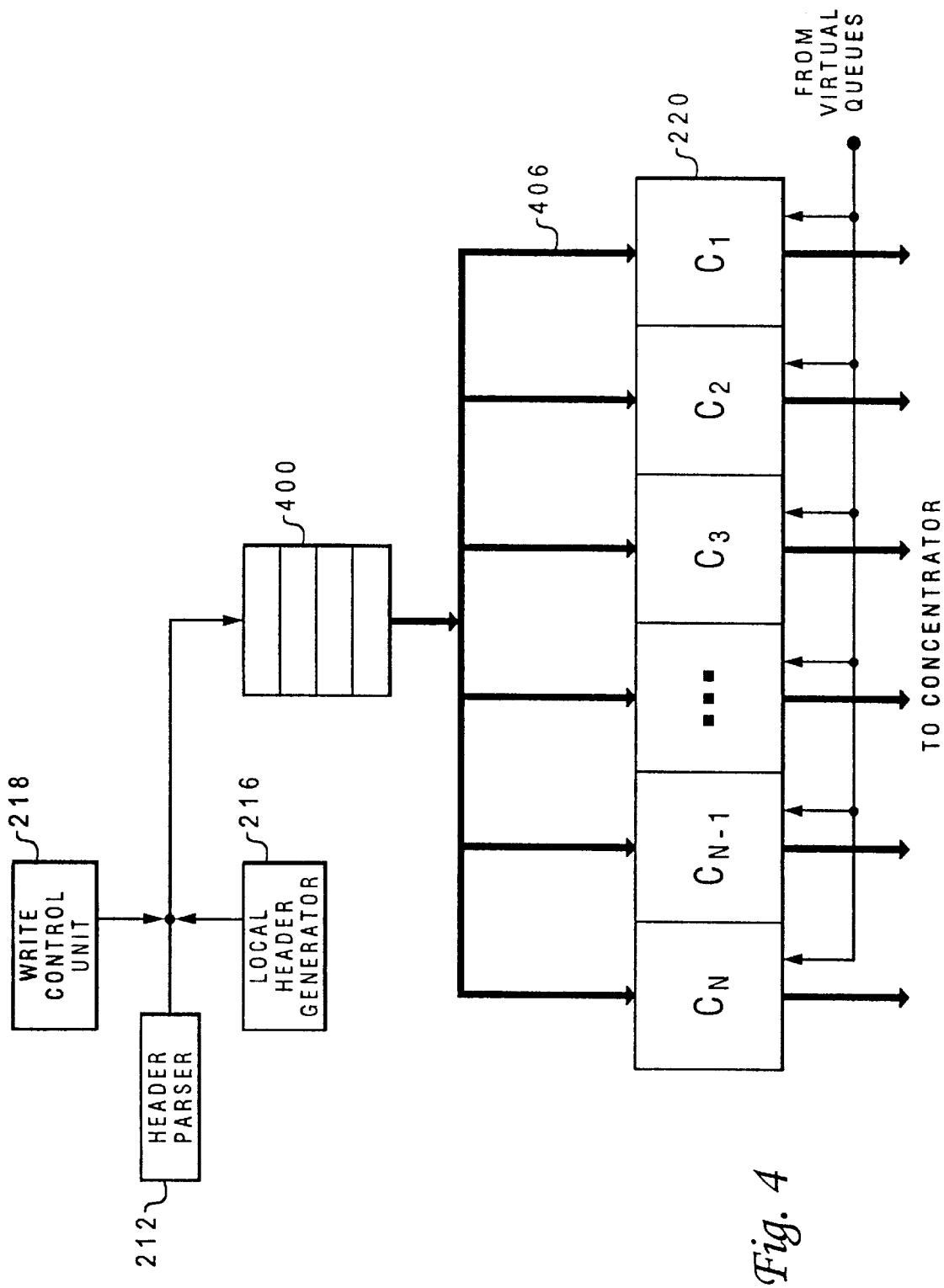
FIG. 4 is a block diagram of an additional finite front (initial) input queue prefixing each original input queue in an input queue may be implemented, as illustrated in accordance with a preferred embodiments of the present invention.

To improve on cell loss rate under different traffic loads, an additional finite front (initial) input queue 400 prefixing each original input queue in input queue 220 may be implemented, as illustrated in FIG. 4 in accordance with a preferred embodiments of the present invention. Each initial input queue 400 stores arriving cells when input queue 220 is full and dynamically feeds the input queue 220 as many cells as possible in a time slot via buses 406. In such a situation, more than one cell may be written into original input queue 220 in a time slot. Such a system is implemented as a two-staged input buffer scheme to distinguish it from a single input buffered scheme without additional finite front input queue.

III. Switch Processes

Figure 5:
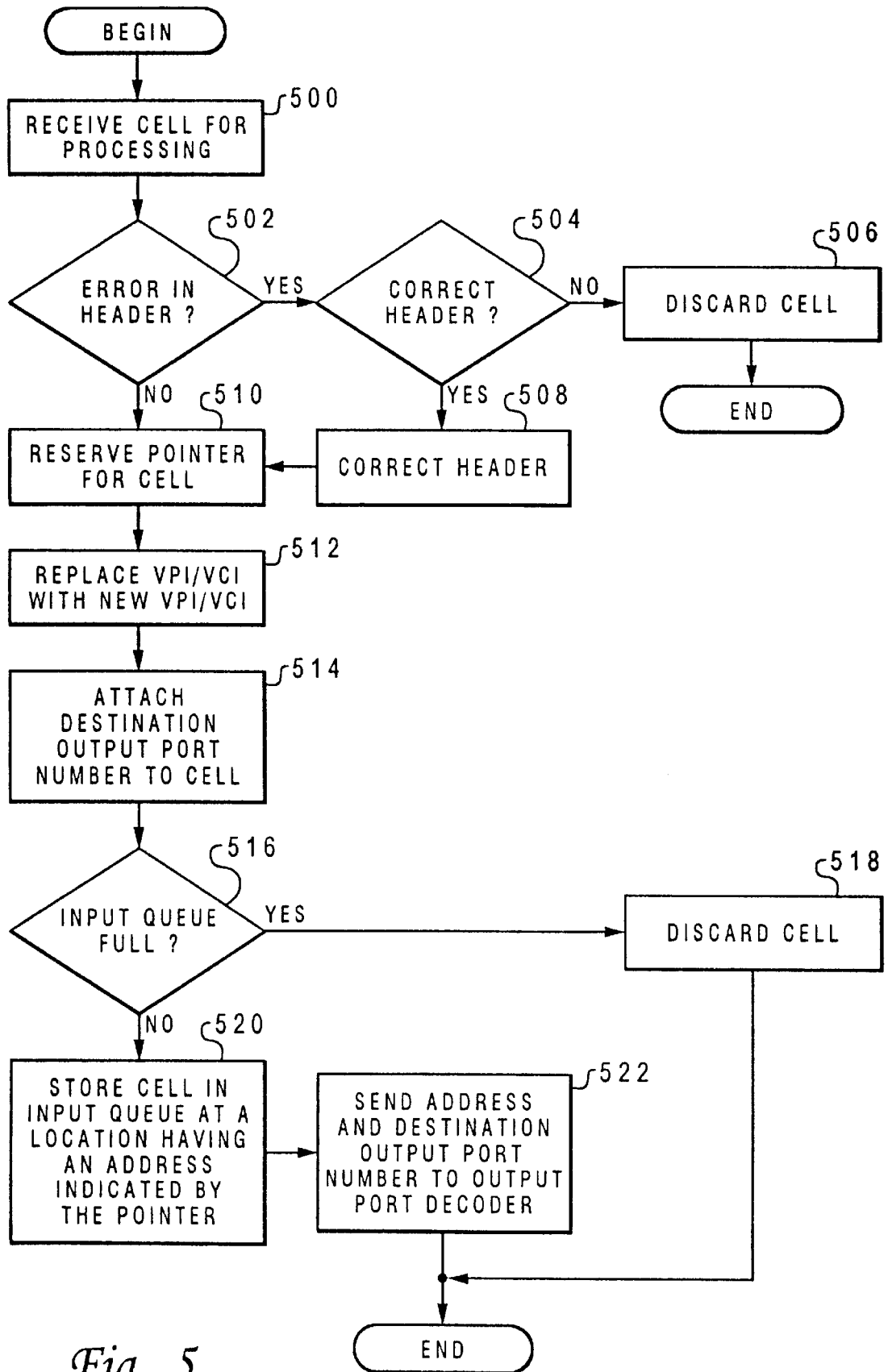
FIG. 5 depicts a flowchart of a process executed by a port unit according to the present invention.

With reference now to FIG. 5, a flowchart of a process executed by a port unit 202 is depicted according to the present invention. The process begins with header parser register 212 receiving a cell for processing (step 500). Thereafter, header parser register 212 checks the header of the ATM cell for possible errors (step 502). If an error is present, a determination is then made as to whether to correct the header (step 504). If the header is not to be corrected, it is discarded step 506) with the process terminating thereafter. If the header is to be corrected, the process then corrects the header (step 508). The determination of whether to correct or discard the header is performed using a known ATM HEC Algorithm. See CCITT recommendation I.361, "BISDN ATM Layer Specification", June, 1992. With reference again to step 502, if no error is present in the header an address ADDR(c) for cell c of some free portion of input queue 220 is reserved for cell c from free cell buffer address pointers in free cell address pointer unit 222 (step 510).

Thereafter, VPI/VCI translation table 214 is employed to replace the incoming VPI/VCI with a new VPI/VCI (step 512). Then, local header generator 216 attaches a destination output port number to cell c (step 514). Thereafter, write control unit 218 determines whether input queue 220 is full (step 516) if cell address input queue 220 is full, the cell is then discarded (step 518). If space is available in cell buffer memory 220, the process then stores cell c at location ADDR(c) in cell buffer memory 220 (step 520). Write control unit 218 also sends ADDR(c) and DEST(c) to the appropriate output port decoder 224 in system controller 204 (step 522) with the process terminating thereafter.

Figure 6:
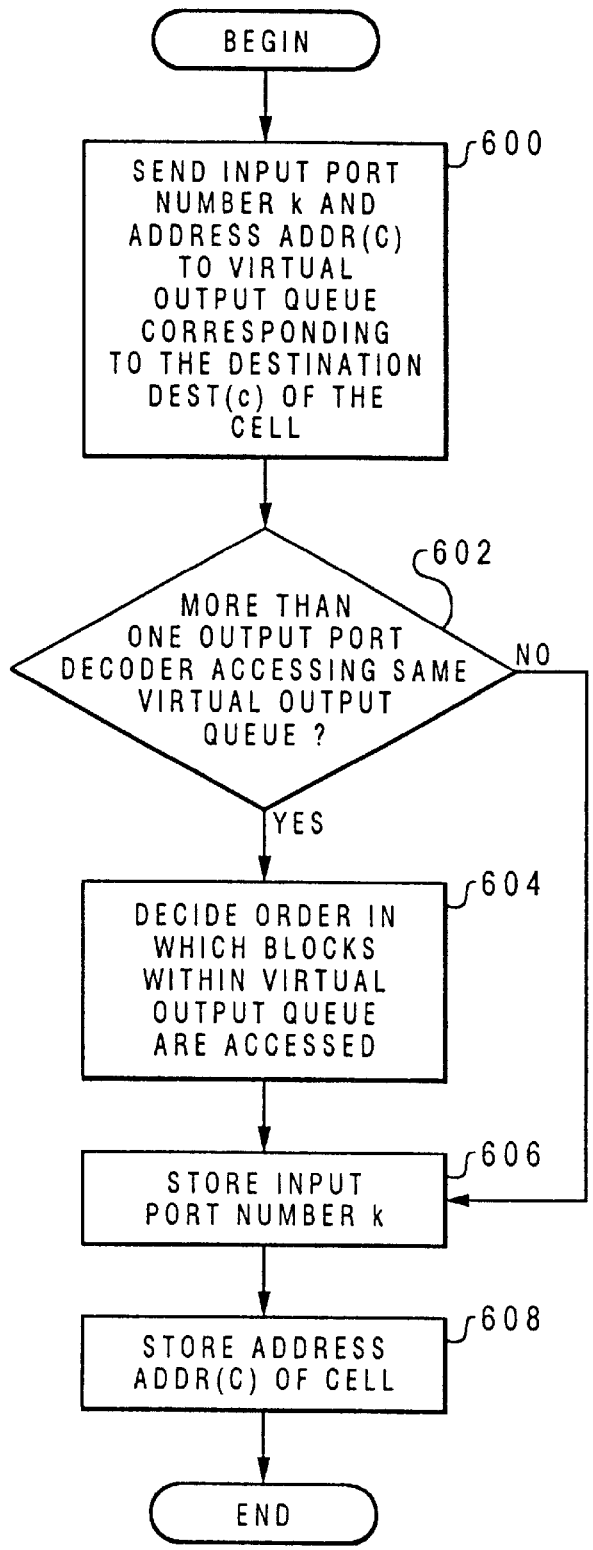
FIG. 6 is a flowchart of a process implemented in system controller according to the present invention.

With reference now to FIG. 6, a process implemented in system controller 204 is depicted according to the present invention. This process occurs in each clock cycle. Each output port decoder D(k) being associated with one input port k. For every address ADDR(c) and destination DEST(c) that output port decoder D(k) receives, output port decoder D(k) sends the input port number k and address ADDR(c) to virtual output queue 228 corresponding to the destination DEST(c) (step 600). Thereafter, a determination is made as to whether more than one output port decoder 224 is attempting to access the same virtual output queue 228 associated with destination DEST(c) (step 602). If more than one output port decoder 228 is trying to access the same output virtual queue DEST(c), then an arbiter unit 224 associated with the virtual output queue decides the order in which blocks in the virtual output queue are accessed (step 604). For example, suppose that the input port unit that corresponds to input 3 sends the address 4 and destination 6 to decoder D(3). Similarly, suppose that the input port unit that corresponds to input 7 sends the address 5 and destination 6 to decoder D(7). Then both D(3) and D(7) attempt to access the virtual output queue 6 simultaneously to place (3,4) and (7,5), respectively. Hence, the arbiter arbitrarily decides which of the two tuples is placed first in virtual output queue 6.

Input port number k for cell c is stored in original input port number subqueue 232 of the virtual output queue DEST(c) (step 606) and address ADDR(c) is stored in cell address subqueue 234 of the virtual output queue DEST(c) (step 608). Referring again to step 602, if only one cell is attempting to access a virtual output queue DEST(c), the process proceeds directly to steps 606 and 608 as described above.

An arbiter unit 226 is associated with each virtual output queue 228 and decides the order in which blocks within virtual output queue 228 are accessed. The arbiter can be circuit based or processor based. Circuit based arbiters are employed in the depicted example for speed over processor based arbiters.

Figure 7:
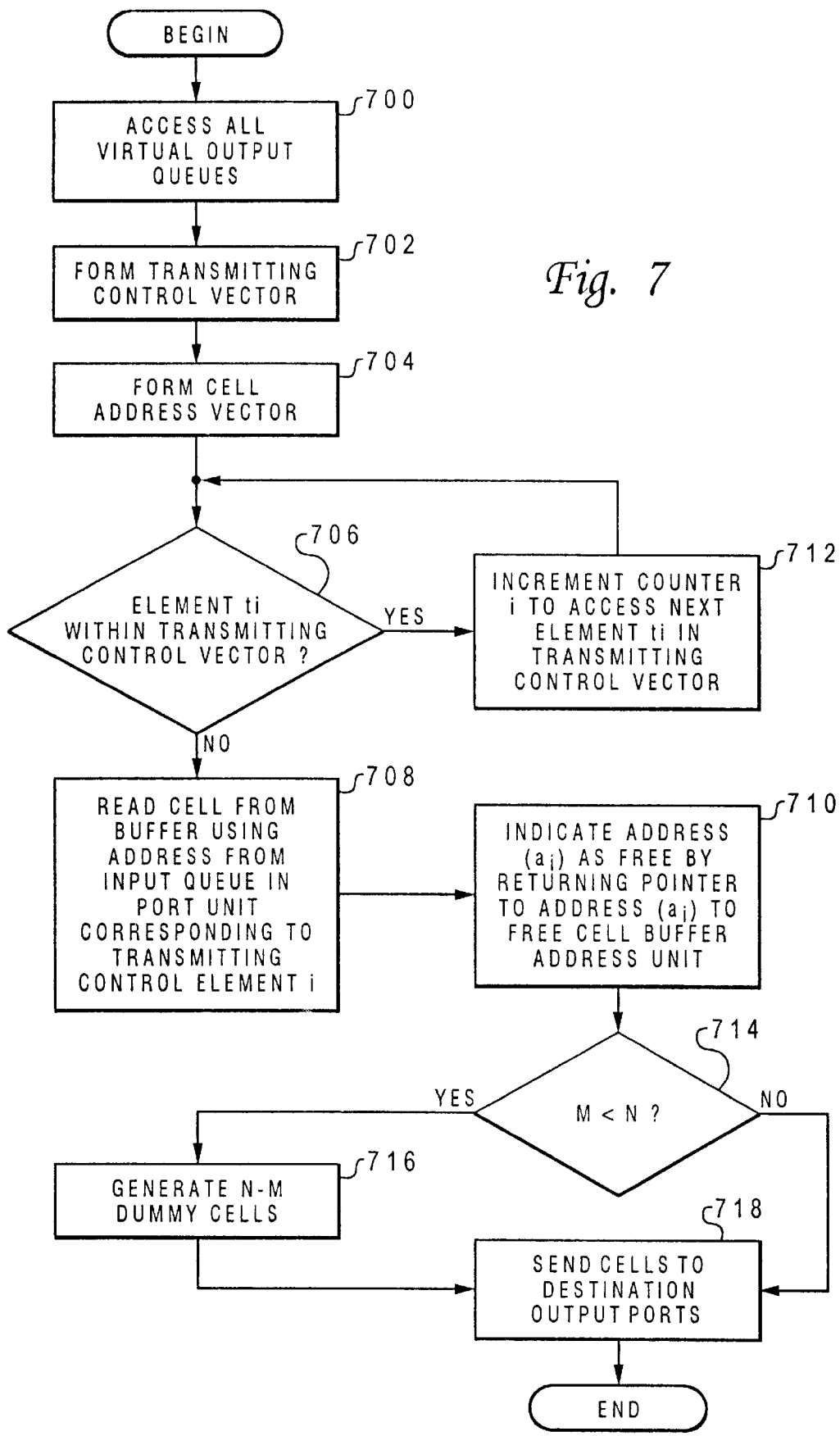
FIG. 7 depicts a flowchart of a process implemented in a reader controller unit according to the present invention.

With reference now to FIG. 7, a flowchart of a process implemented in a reader controller unit 230 is depicted according to the present invention. The process begins with a read control unit accessing all virtual output queues (step 700) to fetch the HOL input port numbers from the originals input port number sequences 232 to form a transmitting control vector ($<t_1, t_2, \ldots, t_N>$) (step 702) and to fetch the HOL cell addresses from the cell address subqueues 234 of the virtual output queues to form a cell address vector ($[a_1, a_2, \ldots, a_N]$) (step 704). An HOL cell address is the address of the cell that is first within the cell address subqueue 234 in a virtual output queue 228. A determination is made as to whether an element $t_i$ in the transmitting control vector is empty (step 706). If the element is not empty, then a cell can be read out from the address ($a_i$) in input queue $t_i$ (step 708). Thereafter address ($a_i$) becomes a free buffer address that is stored in the pool of free cell buffer address pointers in free cell buffer address pointer unit 222 corresponding to input port number $t_i$ (step 710). With reference again to step 706, if the element $t_i$ is empty, the process then increments the counter i for the next element $t_i$ in the transmitting control vector (step 712) with the process then returning to step 706 as described above. This process is performed for each element $t_i$.

Thereafter, a determination is made as to whether the number of M of selected cells is less than N (step 714). If M is less than N, the number of destination output ports, then dummy cell generator unit generates N-M dummy cells with distinct destinations for unrequested N-M output ports (step 716). Thereafter, selected cells are sent to their destinations through concentrator 208 to batcher sorting network 210 (step 718) with the process terminating thereafter. With reference again to step 712, if the number of selected cells is not less than N, then the process proceeds directly to step 718.

IV. Priority Service

According to the present invention, priority determination also may be implemented in the depicted switch unit. Under this process, service quality is improved to lower priority customers, but good service is maintained for higher priority customers.

Figure 8:
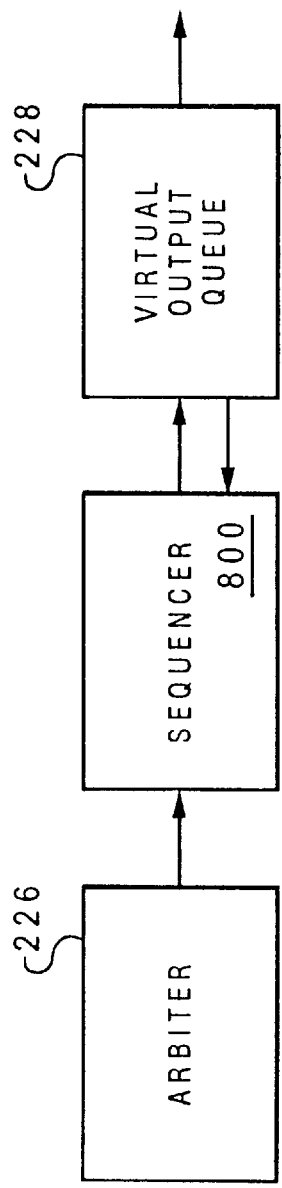
FIG. 8 is a block diagram of a sequencer depicted according to the present invention.

In contrast to nonpriority service, in which all incoming cells at every input port have the same priority, priority services may fall into two categories: (1) fixed priority links for each input link carry cells with a fixed priority and (2) various-party links where each input link can carry cells with various priorities. In implementing either of these types of priority services, two approaches may be employed. In the first approach, each virtual output queue is augmented with a sequencer 800 as depicted in FIG. 8. Sequencer 800 is placed between an input connected to arbiter 226 and an output connected to virtual output queues 228. More information on sequencers may be found in C. Sung, P. T. Sasaki, and R. Leung etc., *A 76-MHz BiCMOS Programmable Logic Sequencer*, IEEE J. Solid-state Cir., Vol. 24, pp. 1287–1294, October 1989 and H. J. Chao, *A Novel Architecture for Queue Management in the ATM Network*, IEEE J. Select. Areas Commun., Vol. 9, pp. 1110–1118, September 1991. New incoming cells on each time slot are inserted by sequencer 800 into positions within sequencer 800 according to the cell's priority values. Then, the priority value the cell in addition to its original input port number and cell address must be sent to the output port decoder 224. Also, the priority is attached to the cell ATM header. Then, the read control unit selects the cells based on the highest priority than based on being HOL.

In the depicted example, the advance priority service process has V priority levels with level zero being the highest priority and level V-1 being the lowest priority. The term "offerload" is the average utilization of each input port in the switch. In any given time slot, the probability that some cell arrives at a particular input port is the offerload, which is also indicated by "P". The throughput (i.e., average utilization of output trunks) is defined as the probability that a particular output port receives some cell in a time slot.

Figure 9:
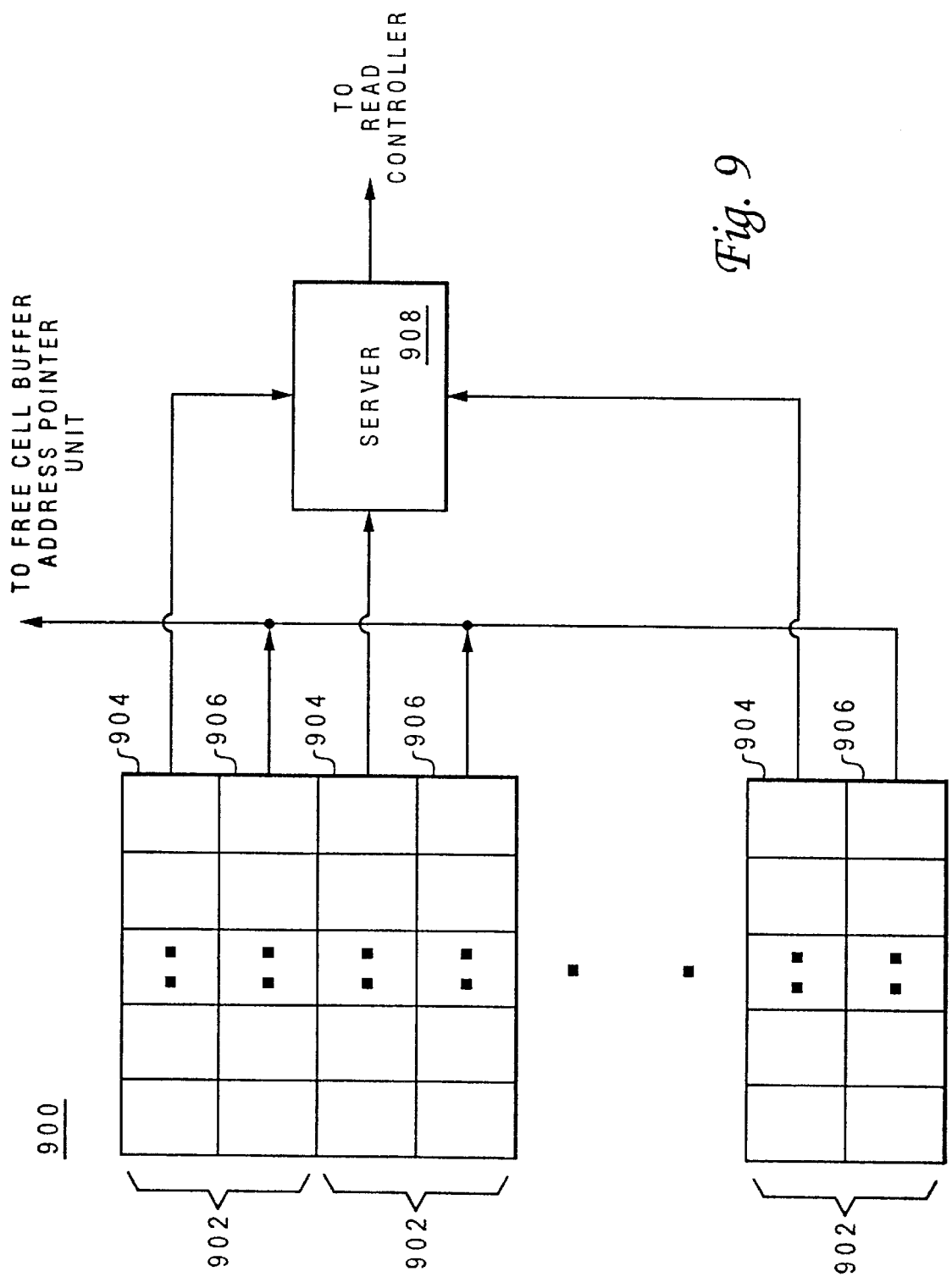
FIG. 9 depicts block diagrams of a virtual output queue for implementing priority levels according to the present invention.

Under the second approach, the virtual output queue may be divided into several subqueues with one subqueue for each priority level as depicted in FIG. 9. With reference to FIG. 9, virtual output queue 900 includes subqueues 902 in which each subqueue 902 contains its own subqueues, an original input port number subqueue 904 and an address subqueue 906. In the depicted example, V subqueues 902 are contained within virtual queue 900 with each subqueue being assigned a priority level within the V priority levels (i.e., 0 to V-1). Server 908 moves to a lower priority queue within virtual queue 900 only when the higher priority queue is empty. Thereafter, server 908 switches back to higher priority queues as soon as the higher priority queues become nonempty. With traditional HOL consistent priority service as described above, providing service to lower priority customers may be difficult. In such a situation, an advance priority service process may be employed as described below.

Each virtual output queue 900 has a server 908. For each virtual output queue Q there exists a server(S(Q)) that chooses a cell from Q's priority subqueues and forwards the cell's original input port number and cell address to the read controller unit. Q is the output port number associated with the virtual output queue. All servers are independent from each other and follow the process illustrated in FIG. 10. The maximum offer load threshold value to relinquish the server is defined as thres where thres=$1.0-(1.0)/V$ and half_thres= $1.0-(0.5) 1.0/(V)$ in the depicted example. The value V is the priority level. The offerload(j, Q) for each priority subqueue j of a virtual output queue Q is computed as:

$$\frac{\text{number of cells in subqueue } j}{\text{time of current time slot} - \text{time of the oldest cell in } j + 1}$$

The server can be in one of two states either in a round robin state or an overload state. In the round robin state, the server handles the HOL cell of subqueue j if, and only if, the server handled the HOL cell of subqueue j-1 the last turn the server was in the round robin state. An HOL cell is the first cell in the subqueue.

Figure 10:
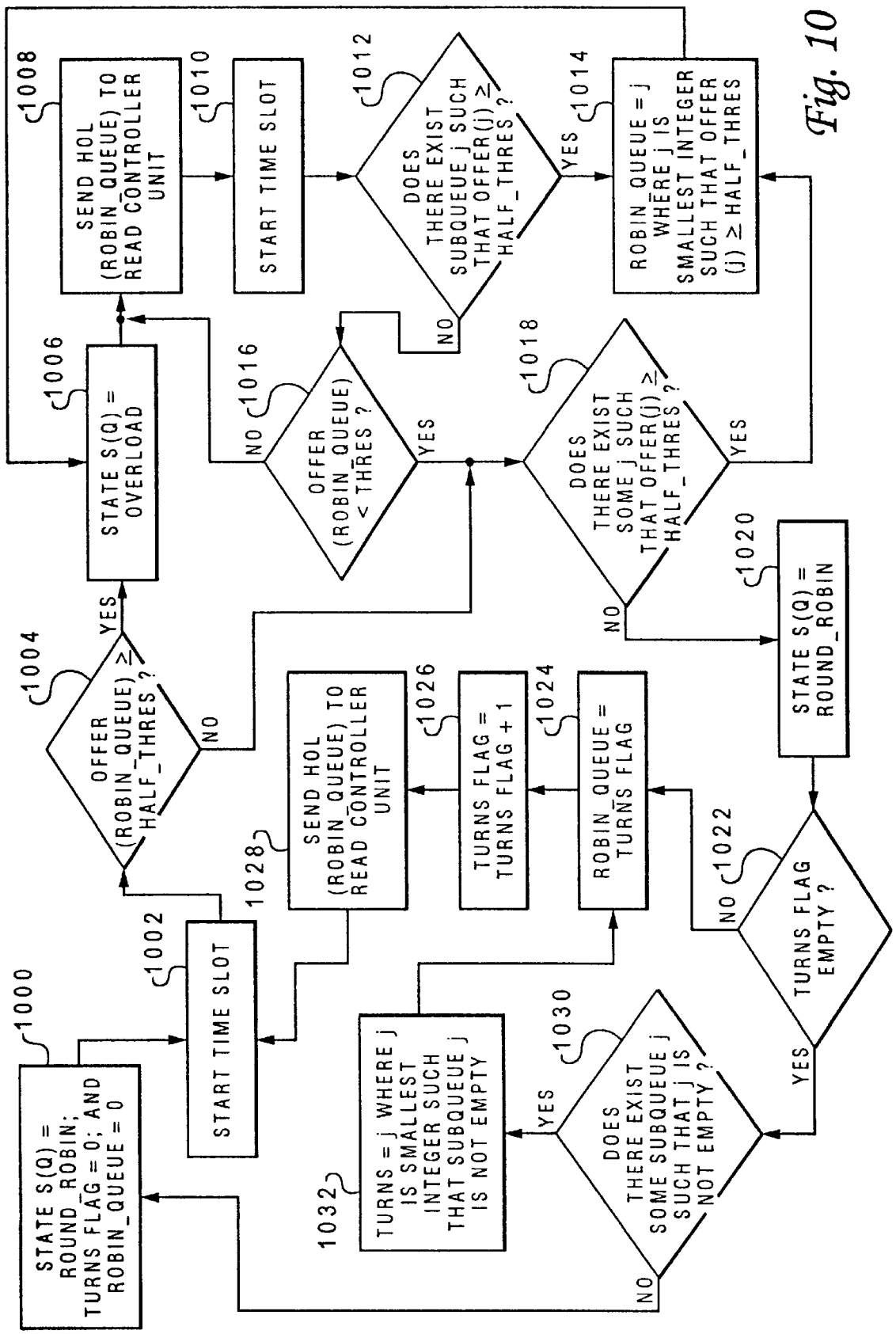
FIG. 10 is a flowchart of a process for priority determination according to the present invention.

Turning to FIG. 10, a flowchart of a process for priority determination is depicted according to the present invention. Initially, the server is in the round robin state. As a result, the process begins by initializing the state of the server equal to a round robin state: state of server S(Q) is set to the round robin state and the variable robin_queue and the turns flag are set equal to 0 (step 1000). The turns flag is a pointer to the subqueue that the server S(Q) handles in a time slot when the server S(Q) is in the round robin state. Then, a time slot begins (step 1002). The process for server S(Q) handles subqueue robin_queue, where subqueue robin_queue is the subqueue currently being processed. A determination is then made as to whether offer(subqueue robin_queue) is greater than or equal to the variable half_thres, which is the minimum offerload threshold value to claim the server (step 1004). OFFER (subqueue j) is the offerload of subqueue j in the depicted example.

If another subqueue p has a higher priority then subqueue j in which offer(p) is greater than or equal to half_thres, then subqueue p claims the server S(Q) and is called overloaded. If offer(robin_queue) is greater than or equal to half_thres, the process then sets the state of the server S(Q) equal to the overload state and server S(Q) continues to handle subqueue robin_queue (step 1006). Thereafter, HOL(robin_queue) is sent to the read controller unit (step 1008). In step 1008, HOL(robin_queue) is the first cell in the subqueue associated with the virtual output queue that is identified by the variable robin_queue (i.e., robin_queue=0 to V-1). Next, another time slot begins (step 1010).

As long as all subqueues with higher priority than subqueue robin_queue have offerloads less than half_thres, subqueue robin_queue continues to claim the server in each upcoming time slot until either offer(robin_queue) becomes less than thres or a subqueue p with a higher priority than subqueue robin_queue has offer(p) greater than half_thres. In the event either of these two cases occur, subqueue robin-queue has stopped being overloaded.

Thereafter, a determination is made as to whether a variable j exists less than the subqueue such that offer(j) is greater than or equal to half_thres (step 1012). Step 1012 checks to determine whether there exists a subqueue j having a higher priority than the current subqueue robin_queue in which that subqueue j has an offerload that is greater than or equal to half_thres. Offer(j) is the offerload of a subqueue j whose priority is the value of variable j. If such a j exists, the process then sets the subqueue robin_queue equal to j, where j is the smallest integer such that offer(j) is greater than equal to half_thres with the process then returning to step 1006 as described above (step 1014).

With reference again to step 1012, if no such j exists, then a determination is made as to whether offer(robin-queue) is less than thres (step 1016). If the determination is no, the process then proceeds to step 1008 as described above. Otherwise, a determination is made as to whether some j exists such that offer(j) is greater than or equal to half_thres (step 1018). In other words, the process determines whether a subqueue is present in which offer j is greater than or equal to half_thres. Robin_queue is the identification of the subqueue that is currently being handled by the server in all states. The process also proceeds to step 1018 from step 1004 if offer(robin_queue) is not greater than or equal to half_thres. If the answer to the determination in step 1018 is yes, the process then proceeds to step 1014 as previously described.

Otherwise, the process sets the server S(Q) equal to the round robin state (step 1020). Thereafter, a determination is made as to whether the subqueue whose priority is equal to the turns flag is empty (step 1022). If the turns flag is not empty, then robin_queue is set equal to the value of the turns flag (step 1024). Thereafter, the process increments the turns flag by one (step 1026) and sends HOL(robin_queue) to the read controller unit (step 1028) with the process then returning to step 1002 with a new slot time beginning.

With reference again to step 1022, if the subqueue whose priority is equal to the turns flag is empty, the process then determines whether some subqueue j exists such that j is not empty (step 1030). In step 1030, the present subqueue is empty and the process is searching for another subqueue j with cells for transfer. If some j exists, such that subqueue j is not empty, the process then sets the turns flag equal to j where j is the smallest integer such that subqueue j is not empty (step 1032) with the process then returning to step 1024. With reference again to step 1030, if no subqueue j exists such that j is not empty, the process then proceeds to step 1000 as described above.

IV. Examples:

A. Analytical Model

In this section, P is used to denote the offerload, and assume the destination requests of arriving cells are uniformly distributed among all output ports.

First, the mean steady-state output queue size is stated for the pure output queueing scheme which is the same as the size of M/D/1 queueing model.

$$\overline{Q}_{M/D/1} = \frac{P^2}{2(1-P)} \qquad \text{(eq. 1)}$$

Therefore, the mean steady-state waiting time (or end-to-end delay) of M/D/1 queueing model is as:

$$\overline{W}_{tM/D/1} = \frac{P}{2(1-P)}$$

Let $P_s$ be the saturated throughput, i.e., throughput when input offerload is 100 percent. $P_s$ for the design according to the present invention can be approximated as: $P_s = -(W-1) + \sqrt{W^{2-1}}$. The intuition is as follows. The proposed scheme emulates output queueing. Since the maximum input queue length is W, then the equation (eq. 1) is modified so that:

$$W = \frac{P_s^2}{2(1-P_s)} + 1$$

The '+1' is because, unlike output queueing, a cell c is discarded in the depicted example if c arrives at an input queue and finds that the input queue is full. This intuition is confirmed by FIG. 11.

Figure 11:
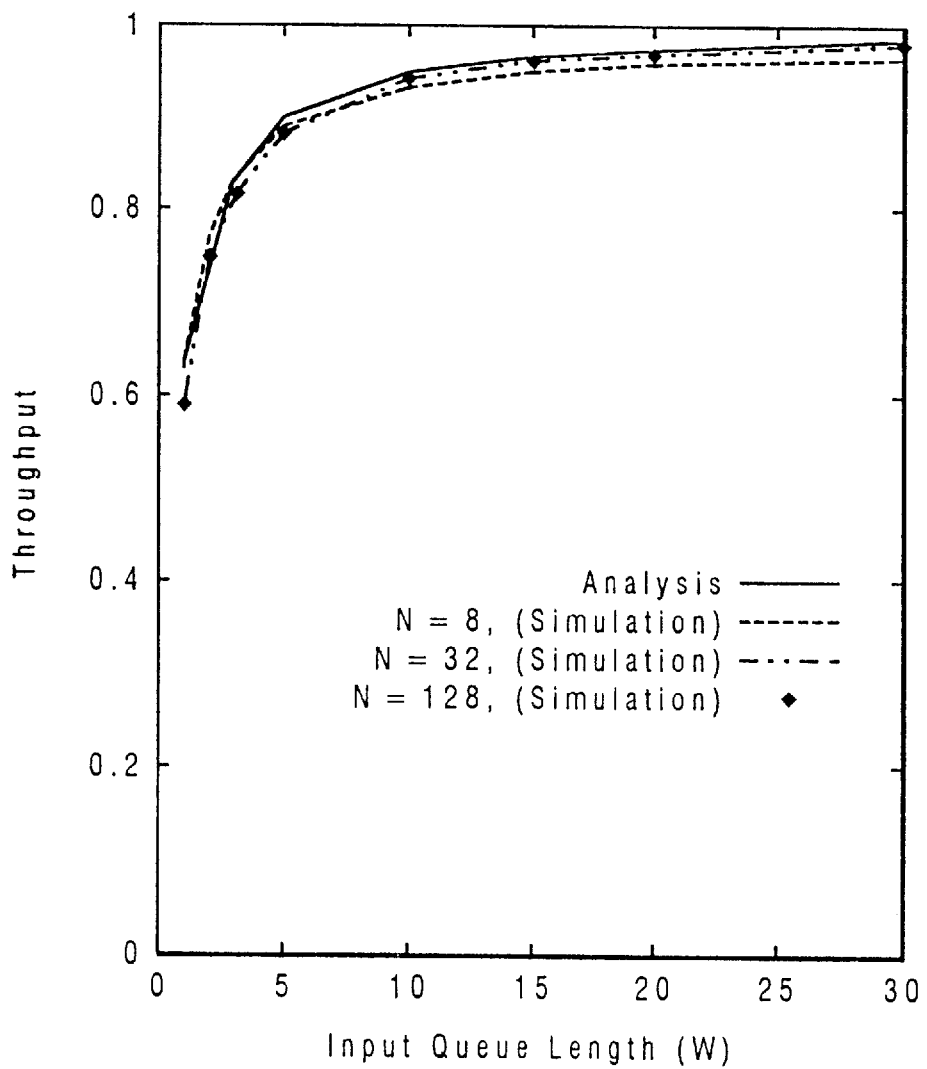
FIG. 11 depicts a plot of saturated throughput $P_s$ versus maximum input queue size W for the analytical results and for simulations based on various values for N according to the present invention.

FIG. 11 is a plot of saturated throughput $P_s$ versus maximum input queue size W for the analytical results and for simulations based on various values for N according to the present invention. It is apparent that for W equal to 10, the saturated throughput is about 0.95, and for W equal to 20, the saturated throughput reaches 0.98 independent of N.

Figure 12:
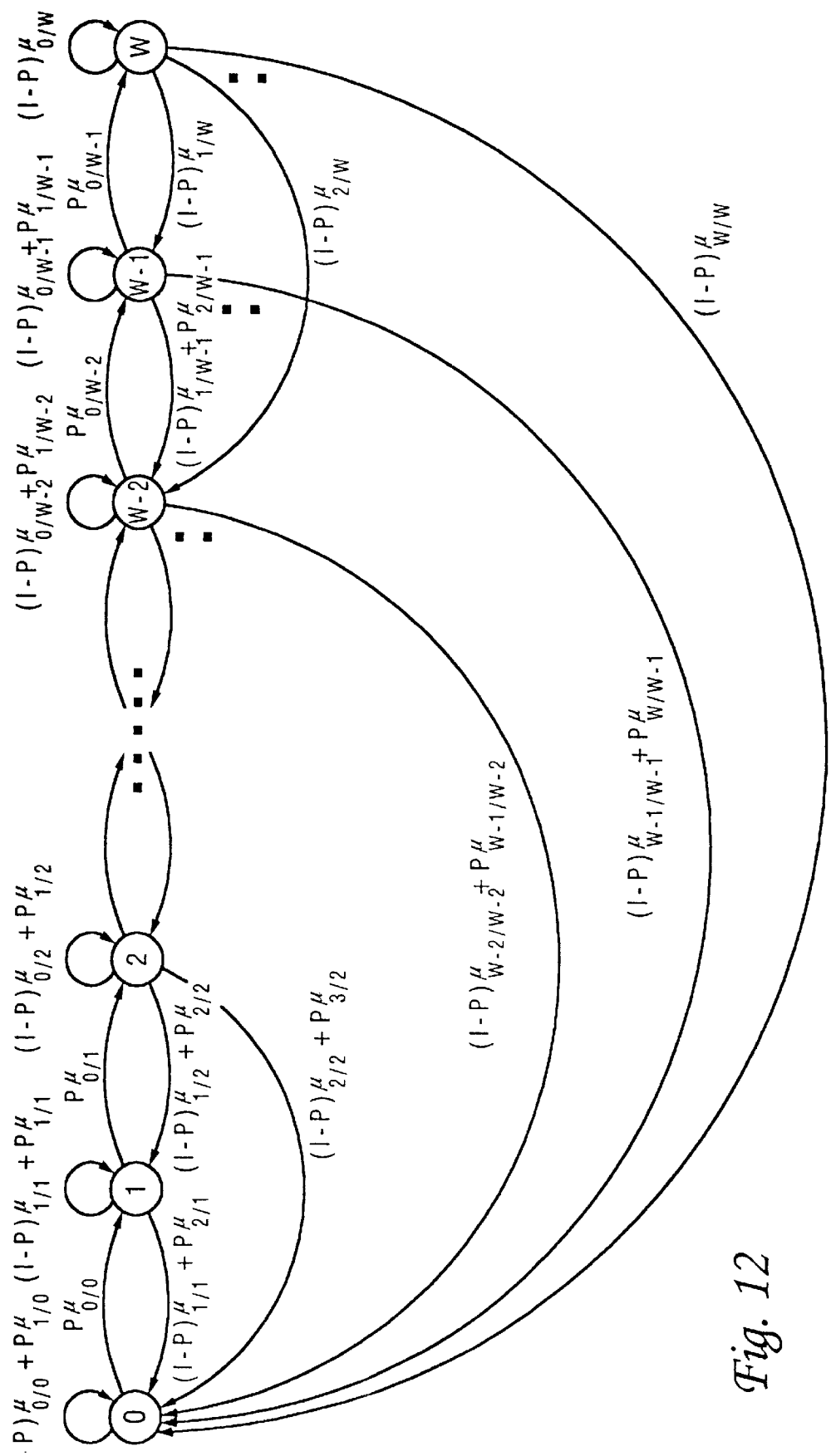
FIG. 12 is a diagram of a discrete-time Marcov Chain for a particular input queue in a one-state-input-buffered scheme according to the present invention.

The discrete-time Marcov Chain for a particular input queue in a one-state-input-buffered scheme is shown in FIG. 12 according to the present invention. To find the end-to-end delay (mean waiting time) of the proposed scheme, the average length of the input queues is found. Then, the end-to-end delay can be obtained by applying Little's Theorem, $$\frac{\text{mean input queue length}}{\min(\text{offerload}, P_s)}.$$

$\mu_{j/i}$ is used to denote the probability that in a time slot, an input queue has i cells (excluding possible incoming cell), and j cells will be served. More information on Little's Theorem can be found in L. Kleinrock, *Queueing Systems*, Wiley, Inc., 1975. Hence, for each state i:

$P_r$(queue=i, no new cell arrives, and j cells are served) is $$(1-\lambda)\mu_{j/i} = (1-\lambda)\binom{i}{j}\left(\frac{1}{L}\right)^j\left(\frac{L-1}{L}\right)^{i-j}$$

(Where $j = 0, 1, \ldots, i$)

$P_r$(queue=i, one new cell arrives, and j cells are served) is $$\lambda\mu_{j/i} = \lambda\binom{i+1}{j}\left(\frac{1}{L}\right)^j\left(\frac{L-1}{L}\right)^{i+1-j}$$

(Where $j = 0, 1, \ldots, i+1$)

(Where L is the mean waiting time in a Virtual Output queue ($L_v$) plus one; thus in a time slot, the probability for a cell to be served is 1/L).

The mean waiting time ($L_v$) can be found as follows: If $P < P_s$, then very few cells are possible discarded, and we can model the virtual output queues as an M/D/1 queues. Hence, $$L_v = \frac{P}{2(1-P)}.$$

On the other hand, if $P \geq P_s$, then it is difficult to model the virtual output queues, because many cells may be discarded. We approximate $L_v$ in this case by $$L_v = \frac{P_s}{2(1-P_s)}.$$

The conservative law for each node in the Marcov Chain model was examined and found that they were all satisfied (as follows):

[0] · $(1 - P)_{\mu 0/0} + P_{\mu 1/0} = 1$
[1] · $(1 - P)_{\mu 0/1} + P_{\mu 1/1} + P_{\mu 0/1} + (1 - P)_{\mu 1/1} + P_{\mu 2/1} = 1$
[2] · $(1 - P)_{\mu 0/2} + P_{\mu 1/2} + P_{\mu 0/2} + (1 - P)_{\mu 1/2} + P_{\mu 2/2} +$
$(1 - P)_{\mu 2/2} + P_{\mu 3/2} = 1$
.
.
.
[w − 1] · $(1 - P)_{\mu 0/w-1} + P_{\mu 1/w-1} + P_{\mu 0/w-1} + (1 - P)_{\mu 1/w-1} +$
$P_{\mu 2/w-1} + \ldots + (1 - P)_{\mu w-1/w-1} + P_{\mu w/w-1} = 1$
[w] · $(1 - P)_{\mu 0/w} + (1 - P)_{\mu 1/w} + \ldots + (1 - P)_{\mu w/w} = 1$ For the analytical results, the global balance equation for state W, is derived. Then, the probability $P_{w-1}$ of the system being in state W-1, can be represented in terms of $P_w$ as $$P_{w-1} = \left( \frac{1}{P\mu_{0/w-1}} \right) \times \sum_{i=1}^{W} (1-P)\mu_{i/w} \times P_w.$$

Again, when the global balance equation for state W-1 is derived, then $P_{w-2}$ can be represented in terms of $P_w$ and $P_{w-1}$, in turn $P_{w-2}$ can be represented in terms of $P_w$ only. The same process repeated until all of the state probabilities are in terms of $P_w$. Then, since $\Sigma^W_{i=0} P_i = 1$, $P_w$ is found, in turn all other state probabilities can be found. After all, the mean steady-state input queue size for proposed buffer scheme with maximum input queue length W and offerload P (or $\lambda$) can be computed using the equation, $\Sigma^W_{i=0} i \times P_i$. Thus, the end-to-end delay of the proposed scheme can be easily obtained.

Figure 13:
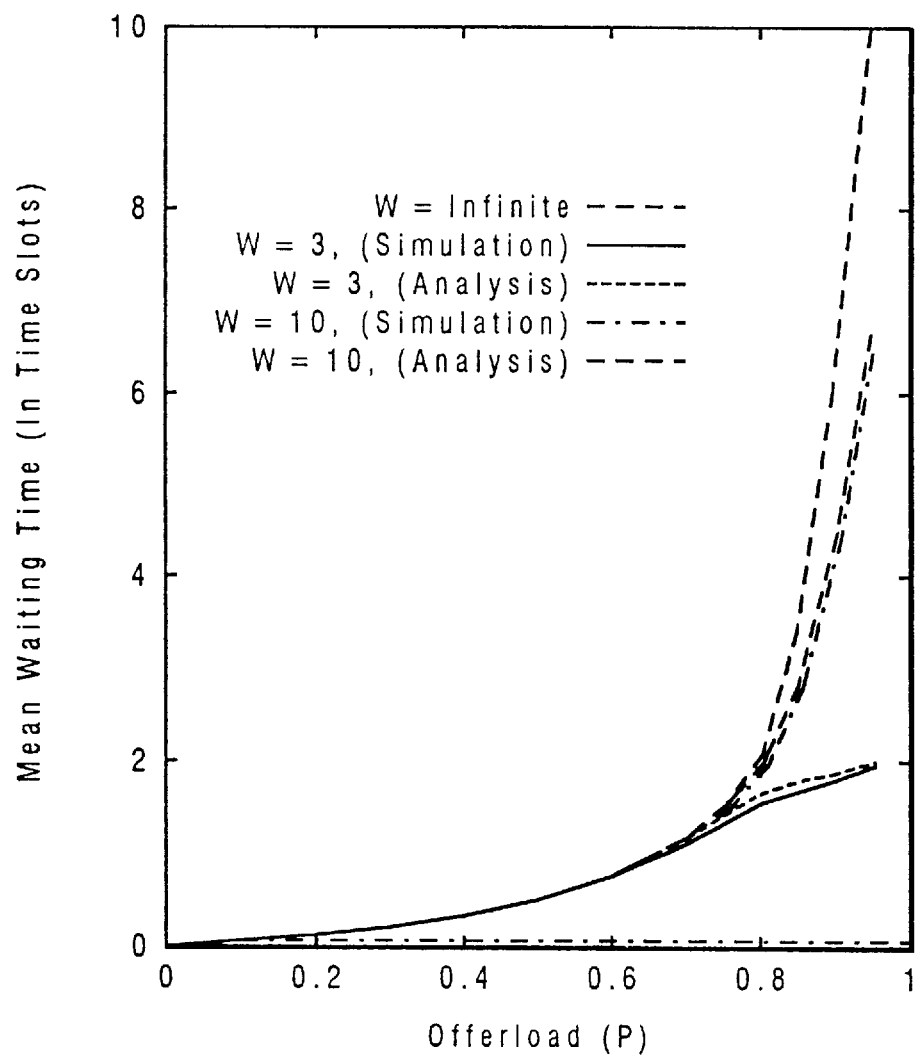
FIG. 13 s a plot of mean end-to-end delay (mean waiting time) versus offerload P (for N=128) for the analytical results and for the simulations based on various maximum input queue length W according to the present invention.

When offerload is less than the saturated throughput, the analytical model produces very accurate results for the mean end-to-end delay. On the other hand, when offerload is greater than the saturated throughput, our analytical model produces approximation results, since many cells may be lost, and the M/D/1 may not be applicable. As shown in FIG. 13, the analytical results still well match the simulation results. The results of simulations were obtained by using Cray Y-1 supercomputer and using recursive programming techniques.

FIG. 13 is a plot of mean end-to-end delay (mean waiting time) versus offerload P (for N=128) for the analytical results and for the simulations based on various maximum input queue length W and uniform traffic. Compared with the results for output queueing scheme such as described in M. G. Hluchyj, and M. J. Karol, *Queueing in High-Performance Packet Switching,* IEEE J. Select. Areas Commun., Vol. 6, pp. 1587–1597, December 1988, the results are very close to those obtained in the finite output queue model. As W grows, results are close to those obtained in the infinite output queue model.

Figure 14:
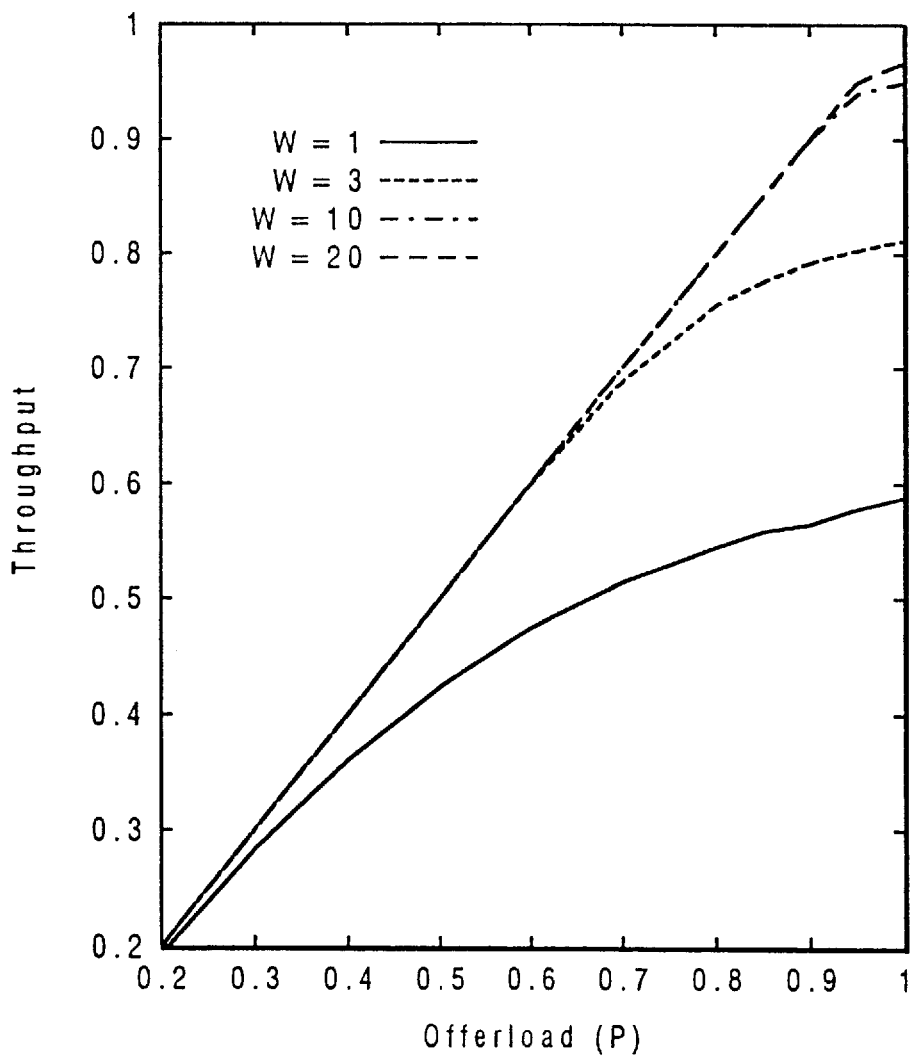
FIG. 14 is a plot showing the simulation results, for various values of input queue size (W), for the throughput as a function of offerload(P) when N=128 under uniform traffic according to the present invention.

B. Simulation Results For One-stage-input-buffered Scheme Performance Under Uniform Random Traffic And No Priority FIG. 14 is a plot showing the simulation results, for various values of input queue size (W), for the throughput as a function of offerload(P) when N=128 under uniform traffic according to the present invention. It is apparent that for W only equal to 20, the saturated throughput is about 0.98, and for W equal to 10, the saturated throughput reaches 0.95. Following the trend, throughput decreases as W decreases, and when W is one, the saturated throughput is about 0.6. The throughput in buffer scheme according to a preferred embodiment of the present invention with W=10 is about the same as that in the cell scheduling scheme. However, the hardware complexity of the scheme is much less than the cell scheduling hardware complexity.

Figure 15:
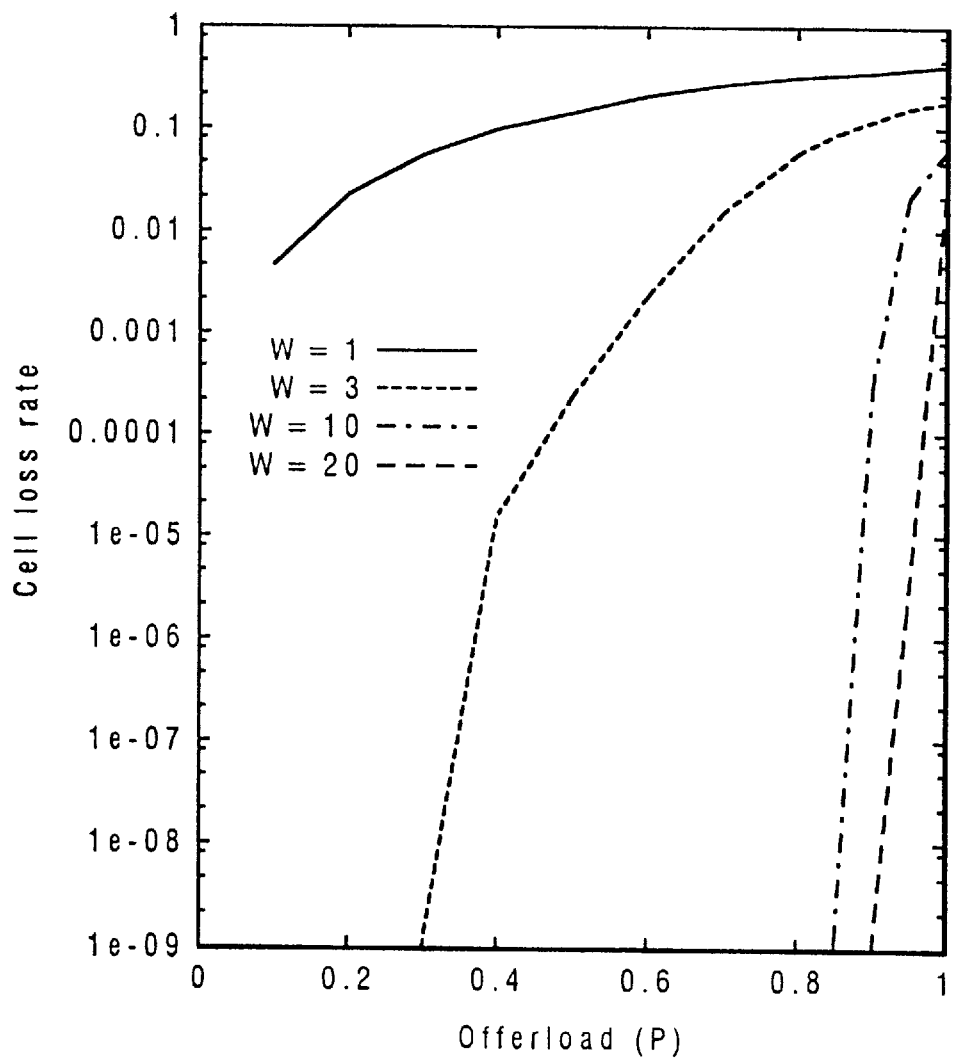
FIG. 15 is a plot illustrating simulation results, for various values of input queue size, W, for cell loss rate as a function of P offerload when N=128 under uniform traffic according to the present invention.

The plot in FIG. 15 illustrates simulation results, for various values of input queue size, W, for cell loss rate as a function of P offerload when N=128 under uniform traffic according to the present invention. From FIG. 15, for W=1, the cell loss is at $10^{-3}$ even for an offerload as low as 0.1; for W=3, the cell loss is at $10^{-9}$ when the offerload at 0.3 or below. Moreover, when W=10, the cell loss is at $10^{-9}$ if the offerload is less than or equal to 0.85; when W=20, the cell loss is at $10^{-9}$ if the offerload is less than or equal to 0.9. From FIG. 14 and FIG. 15, it is apparent that the buffer scheme of the present invention can provide very good performance, like high throughput and low cell loss rate, with $W \geq 10$.

Although all figures shown are for N=128, simulations were run for various N values and found that the performance of the proposed scheme is not sensitive to network size. FIG. 11, which shows a saturated throughput versus input queue size W for various values of N also supports this claim.

C. Simulation Results For One-stage-input Buffered Scheme Performance Under Bursty Traffic And No Priority Bursty traffic usually can be characterized by the average burst length (duration), and the average number of time slots between cells of a given burst (separation). Here, the distribution of duration is assumed to be the same for all bursts arriving at any input line, and durations are chosen independently by a geometric distribution; the separation also follows another geometric distribution. The output port requested by a burst is also assumed to be uniformly distributed over all output ports. It is noted that if the separation and the duration all become unity, then the traffic model is the independent uniform traffic.

Figure 16:
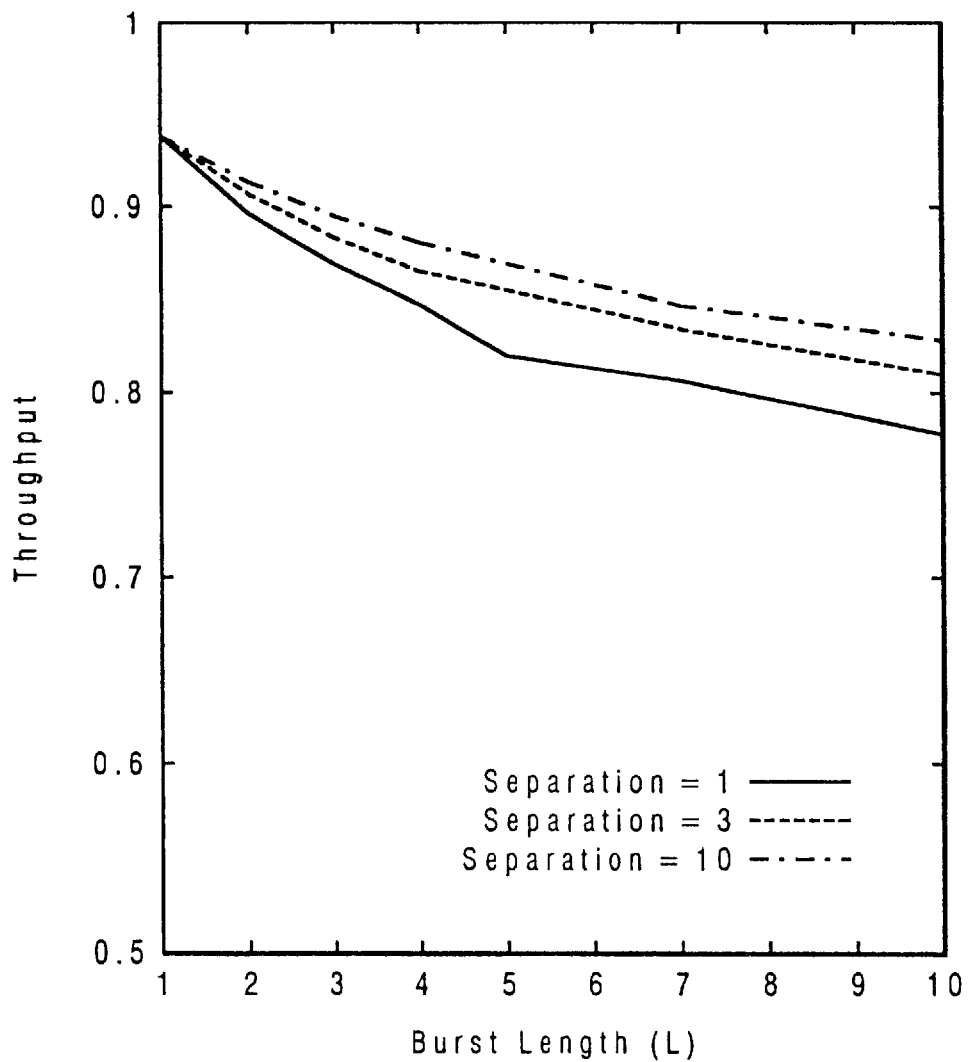
FIG. 16 is a plot showing the simulation results, for separation 1, 3, and 10, of the throughput as a function of duration under bursty traffic when N=128 according to the present invention.

FIG. 16 shows the simulation results, for separation 1, 3, and 10, of the throughput as a function of duration under bursty traffic when N=128. The proposed buffer scheme can still maintain good throughput even for a duration as long as 10, and for larger separation the degradation in throughput becomes smaller.

D. Simulation Results For Two-stage-input-buffered Scheme Performance Under Uniform Traffic And No Priority In order to further improve the cell loss rate under medium traffic offerload (e.g., 0.8), a two-stage-input-buffered scheme may be employed. In this scheme, an additional finite initial input queue ($W_i$) prefixes each original input queue (W) to store the arriving cells when the original input queue is full, and to dynamically feed the original input queue as many cells as possible in a time slot. Note that only cells in the original input queue will be put into their destination Virtual Output queues to be scheduled for accessing the network.

Figure 17:
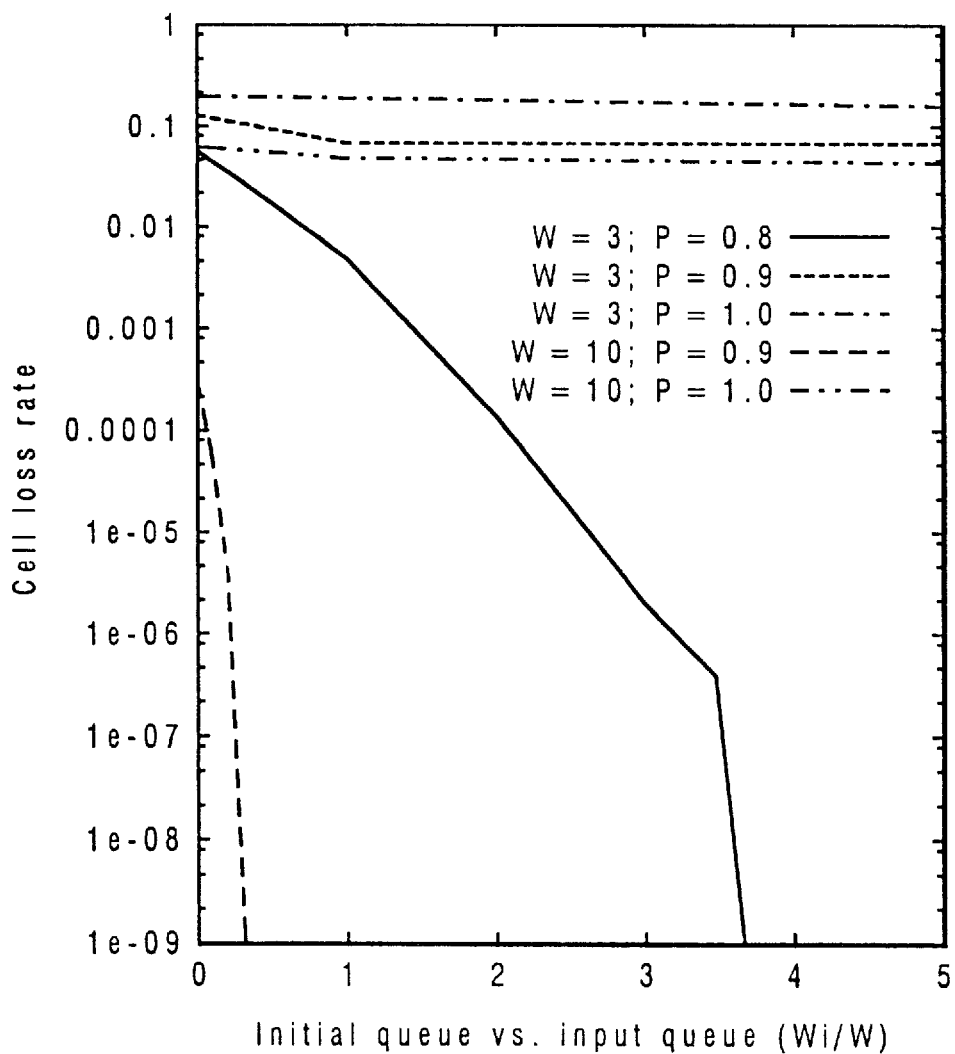
FIG. 17 is a plot depicting, for various values of input queue size, W, and offerload P, the cell loss rate as a function of $W_1/W$ for N=128 under uniform traffic according to the present invention.

Simulation results shown in FIG. 17 depicts, for various values of input queue size, W, and offerload P, the cell loss rate as a function of $W_i/W$ for N=128 under uniform traffic. FIG. 17 reveals that for W=3 and P=0.8, the original cell loss rate is 0.055 without the additional initial input queue, but the loss rate becomes $10^{-9}$ with an initial input queue of size 3.7 W(=11). Moreover, for W=10 and P-0.9, the original cell loss rate is about $10^{-4}$ without the additional initial input queue, but the loss rate becomes $10^{-9}$ with an initial input queue of size only 0.3 W(=3). From the rest of the plot, we can observe that under full load traffic (P=1), the additional initial input queue would not improve the cell loss rate much since the additional queue becomes itself flooded.

E. Simulation Results for Priority Service

In contrast to the non-priority service, in which all incoming cells at every input port have the same priority, priority services fall into two categories: (1) fixed-priority links where each input link carries cells with a fixed priority, and (2) various-priority links where each input link can carry cells with various priorities. To implement either of these priority services in our design, there are two approaches. One approach is to transform each virtual output queue into a sequencer in which new coming cells in each time slot are inserted into positions in the sequencer according to the cells' priority values. Then, the priority value of the cell in addition to its original input port number and cell address becomes necessary. The second approach is to divide each virtual output queue into several subqueues, one subqueue for each priority level. The server then follows the HOL consistent priority service strategy, in which the server moves to a lower priority subqueue only when the higher priority queue is empty, and the server switches back to higher priority queues as soon as the higher priority queues become non-empty. In the simulations, the second approach was used and only the one-stage-input-buffered model was considered.

Figure 18:
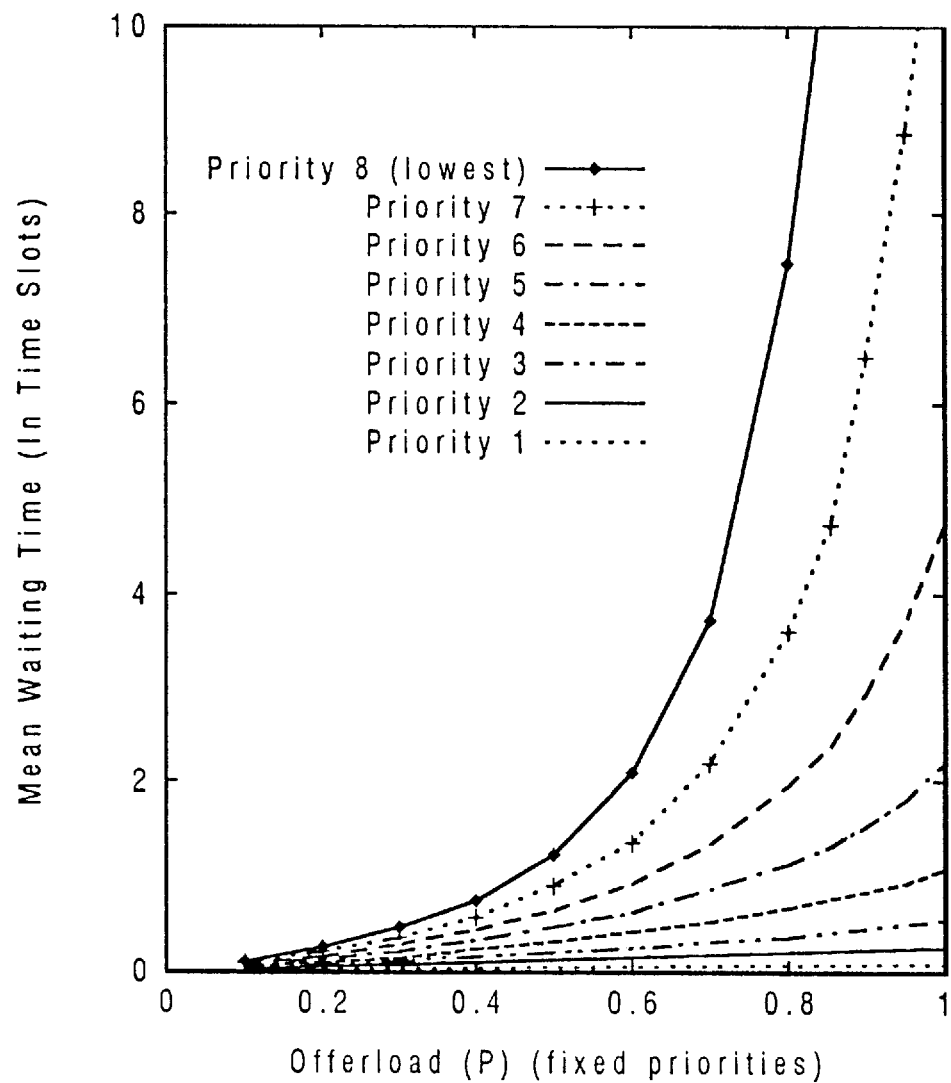
FIG. 18 is a plot illustrating simulation results, for priority levels 1 to 8, of the cell mean waiting time versus offerload P when N=128 under the fixed-priority scheme in which each input link has its priority fixed according to the present invention.
Figure 19:
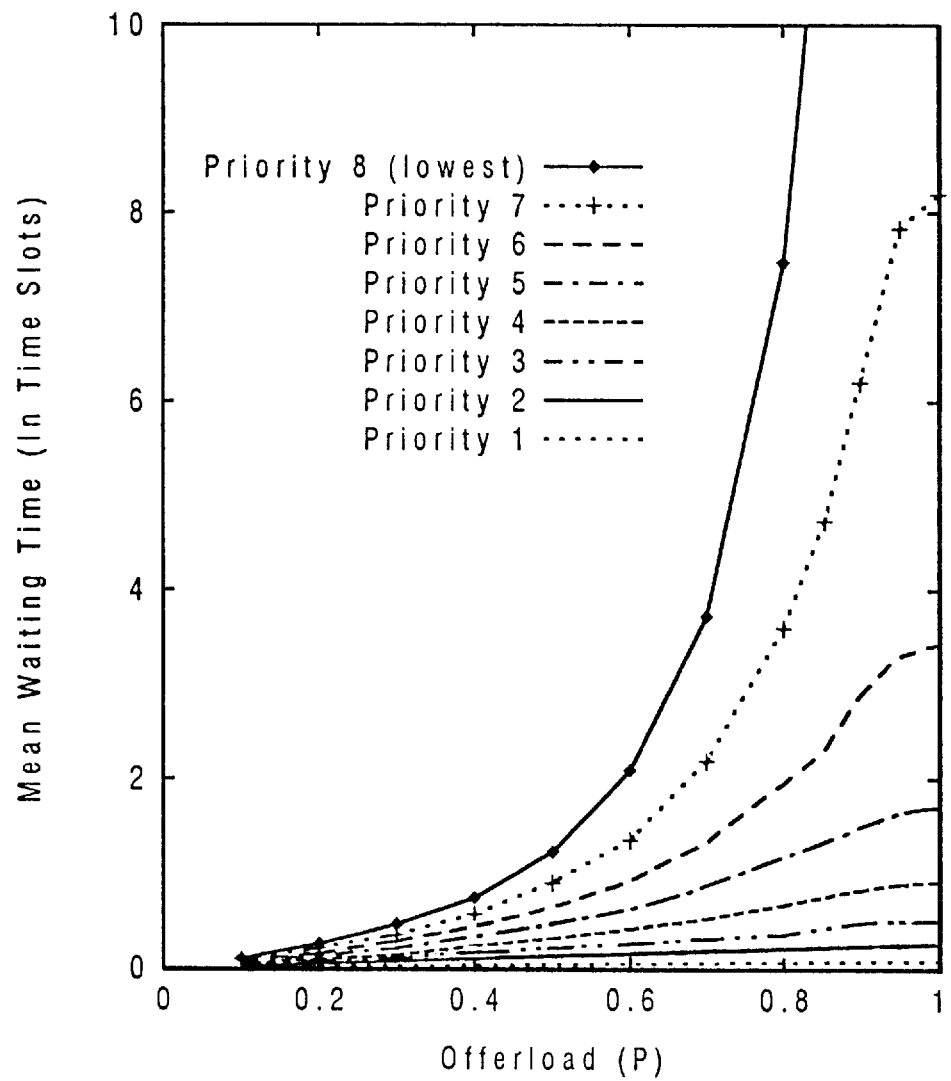
FIG. 19 is a plot depicting the simulation results, for priority levels 1 to 8, of the cell mean waiting time versus offerload P when N=128 in which each input link can carry cells with various priorities according to the present invention.

FIG. 18 is a plot illustrating simulation results, for priority levels 1 to 8, of the cell mean waiting time versus offerload P when N=128 under the fixed-priority scheme in which each input link has its priority fixed. FIG. 19 is a plot depicting the simulation results, for priority levels 1 to 8, of the cell mean waiting time versus offerload P when N=128 in which each input link can carry cells with various priorities. Comparing FIG. 18 with FIG. 19, it is apparent that the various-priority link service offers better performance than the fixed-priority link especially when the offerload is close to fall load.

Figure 20:
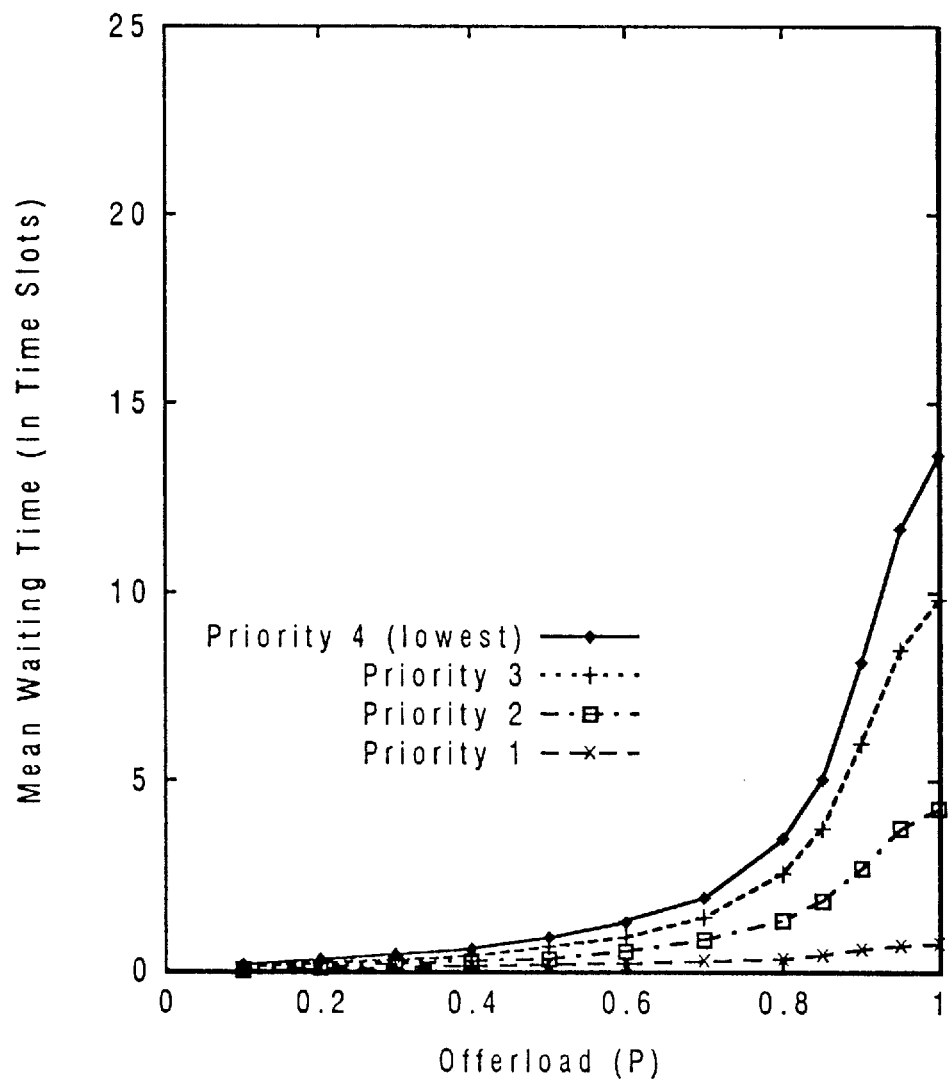
FIG. 20 is a plot depicting the simulation results, for priority levels 1 to 4, of the cell mean waiting time versus offerload P when N=128 under the various-priority scheme for the advanced priority service algorithm according to the present invention.
Figure 21:
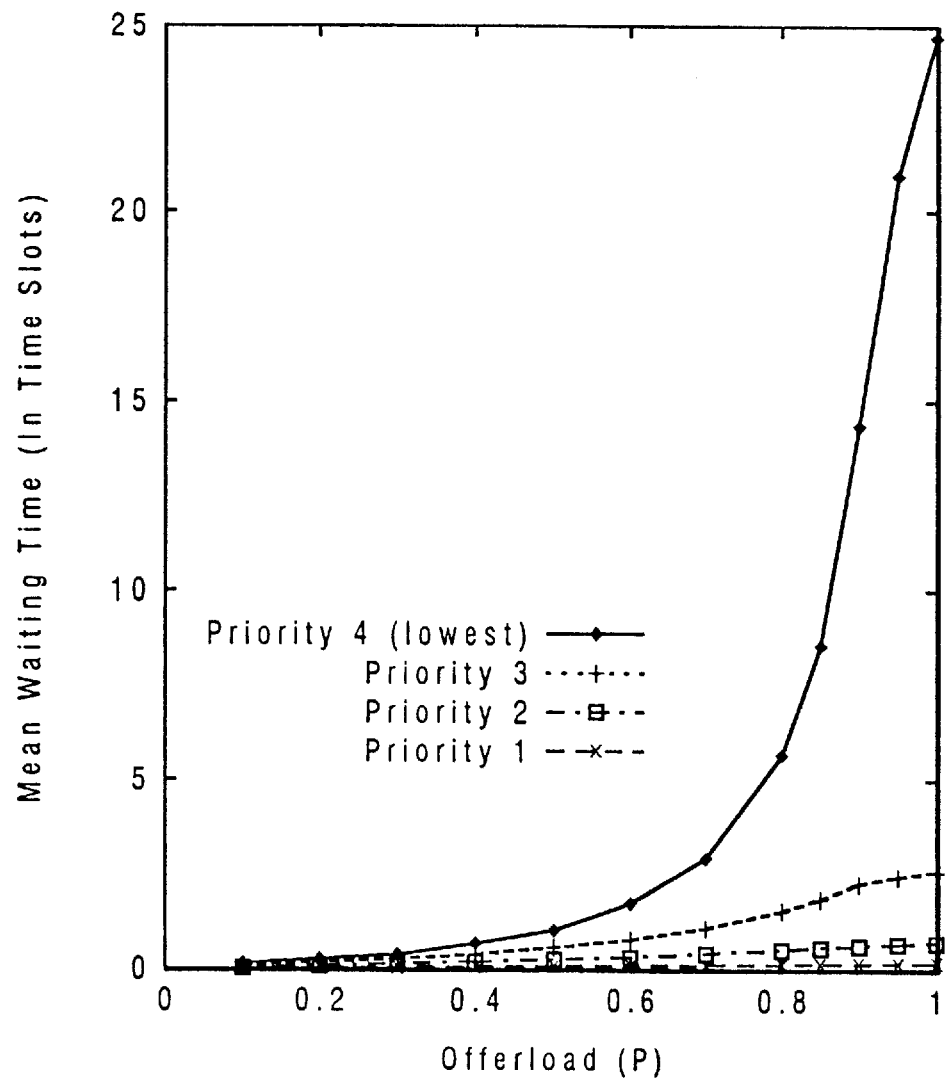
FIG. 21 is a plot showing the simulation results for priority levels 1 to 4, of the cell mean waiting time versus offerload P when N=128 under the various-priority scheme for the HOL consistent priority service method according to the present invention.

FIG. 20 depicts the simulation results, for priority levels 1 to 4, of the cell mean waiting time versus offerload P when N=128 under the various-priority scheme for the advanced priority service algorithm according to the present invention. FIG. 21 shows the simulation results for priority levels 1 to 4, of the cell mean waiting time versus offerload P when N=128 under the various-priority scheme for the HOL consistent priority service method. Comparing FIG. 20 with FIG. 21, we conclude that the mean waiting time of the lowest priority service suffers a long delay in the traditional HOL consistent priority service strategy, but the delay is improved dramatically under the advanced priority service algorithm with only a small degradation in the mean waiting time for higher priority services.

F. Hardware Estimate of One-Stage-Input-Buffered Switch

For each input, we only count the cost of the Cell Buffer memory of W cells as $C_W$. Since there are N input ports, the total cost $C_{WN}$ is $N \times C_W$. In the global system controller, we count the cost of the read controller unit (rcu) as $C_{rcu}$, but ignore the cost of the N virtual output queues since they only consume small memory to store the cells' original input port number and address pointer register. Moreover, the scheme has a global advanced W×N:N concentrator, dummy cell generator unit, and a batcher sorting network.

An advanced N-input concentrator proposed in M. J. Narasimha, *A Recursive Concentrator Structure with Applications to Self-Routing Switching,* IEEE Trans. Commun., Vol. 42, pp. 896–898, No. 2/3/4, February 1994, requires hardware complexity of $O(N\log_2 N)$. Thus, the cost of the advanced W×N:N concentrator used in proposed scheme is as $$\frac{WN}{2} \log_2 WN.$$

Moreover, the cost for a N-input batcher sorting network is $N/4(\log_2 N + (\log_2 N)^2)$, and the cost of the dummy cell generator is $C_{dum}$.

The overall hardware cost of the proposed buffer scheme is as follows:

$$C_{bf} = C_{WN} + C_{RCU} + \frac{WN}{2} \log_2 WN +$$

$$C_{dum} + \frac{N}{4} (\log_2 N + (\log_2 N)^2) = O(N(\log_2 N)^2)$$

From above analysis, we know that the overall hardware cost is dominated by the cost of the batcher sorting network. Recently, it has been proposed an adaptive binary sorting network which uses a prefix adder scheme with cost of only $O(N(\log_2 N))$. Since in present invention, W can be viewed as a fixed value for a desired performance, the cost of the advanced W×N:N concentrator is still $O(N(\log_2 N))$. Thus, overall hardware cost of the proposed buffer scheme is $O(N(\log_2 N))$. Note that system controller in design of the present invention is no more complex than the control units used in M. J. Karol, M. G. Hluchyj, and S. P. Morgan, *Input verses Output Queueing on a Space-division Packet Switch,* IEEE Trans. Commun., Vol. 35, December 1987, since for all kind of input queueing schemes, a global controller to resolve output port contentions is inevitable.

In case that the hardware cost is really crucial, the architecture may be modified to further reduce the hardware cost but at the expense of slightly degradation in the saturated throughput. This modified architecture is called a limited-selection scheme. The modification is as follows: In every input queue, a W:$W_s$ selector (filter) is added, which will fairly choose $W_s$ cells out of the W cells requested by RCU (if W>$W_s$) to access the network, and the acknowledgement of these $W_s$ cells is sent back to RCU. Only the acknowledged HOLs can leave virtual output queues. Thus, the size of the required concentrator is reduced to be $W_s \times N:N$.

G. Performance Comparisons

From Table 1 in FIG. 22, one-stage-input-buffered switch of the present invention provides comparable saturated throughput and cell loss rate with smaller queue length and less hardware cost than other existing schemes. More information on the input window, unbuffered, and cell scheduling scheme may be found in T. T. Lee, *A Modular Architecture for Very Large Packet Switches,* IEEE Trans. Commun., Vol. 38, No. 7, pp. 1097–1106, July, 1990, and SunShine in J. N. Giacopelli, J. J. Hickey, W. S. Marcus, and W. D. Sincoskie, *SunShine: A High-Performance Self-Routing Broadband Packet Switch Architecture,* IEEE J. Select. Areas Commun., Vol. 9, pp. 1289–1298, October 1991, output queueing in M. J. Karol, M. G. Hluchyj, and S. P. Morgan, *Input verses Output Queueing on a Space-division Packet Switch,* IEEE Trans. Commun., Vol. 35, December 1987, input queueing in W. -T. Chen, H. -J. Liu, and Y. -T. Tsay, *High-Throughput Cell Scheduling for Broadband Switching System,* IEEE J. Select. Areas Commun., Vol. 9, pp. 1510–1523, December 1991.

Thus, the present invention provides a switch for routing ATM cells that has no internal blocking, employing a buffer management scheme in which finite input queues and virtual output queues are employed with a speed factor of one to emulate the performance of output queueing. Switches designed according to the present invention are able to satisfy quality of service requirements for various multimedia services, but with a smaller hardware cost than that of existing ATM switches. Additionally, the present invention allows the use of inexpensive technologies that consumes small amounts of power while being scalable to handling various amounts of total traffic. Additionally, the present invention is not affected by network size.

The present invention provides various advantages over other switch architectures because HOL blocking is avoided by allowing cells from each of the input cell buffers (input queues) being read simultaneously to the concentrator. Additionally, the present invention allows for the selection of an optimal value of the number of packets and input cell buffers such that the quality of service values for the offered traffic is satisfy while the cost of the switch is minimized.

The present invention provides a high performance buffer management scheme in which finite input queues and virtual output queues are employed with a speedup factor equal to only one in a non-blocking switching network to emulate output queueing performance. With the use of a speedup factor equal to one, the hardware cost significantly decreases, but performance remains closed to that of output queueing. Additionally, the present invention only requires a single sorting network (batcher sorting network) without the need to use a routing network with the introduction of dummy cells as generated by dummy cell generator 206 in FIG. 2.

Additionally, with a two-stage-input-buffered configuration, cell loss rates are improved. A priority service process under the present invention reduces the delay for low priority cells without a significant increase in delay for high priority cells.

The description of the preferred embodiment of the present invention has been presented for purposes of illustration and description, but is not intended to be exhaustive or limit the invention in the form disclosed. Many modifications and variations will be apparent to those of ordinary skill in the art. For example, the present invention may be employed to provide switching for other types of data packets other than ATM cells. The embodiment was chosen and described in order to best explain the principles of the invention and the practical application to enable others of ordinary skill in the art to understand the invention for various embodiments with various modifications as are suited to the particular use contemplated.

What is claimed is:

1. An apparatus for routing data packets comprising:

a plurality of inputs for receiving data packets;

first storage means for storing data packets received at the plurality of inputs, the storage means having a plurality of portions, wherein each portion within the plurality of portions is associated with an input within the plurality of inputs and contains a number of segments and wherein a data packet may be stored within each segment within the number of segments;

address translation means for assigning a destination from a plurality of destinations to each data packet received at the plurality of inputs;

second storage means having a plurality of sections, each section within the plurality of sections being associated with one of the plurality of destinations and having a plurality of segments, wherein the second storage means stores, in a section within the plurality of sections, location information identifying locations of the data packets within the plurality of sections associated with the destination assigned to the data packet in the first storage means; and reading means for transferring data packets stored in the first storage means to the plurality of destinations using the location information identifying the locations of the data packets, wherein the reading means accesses location information in each of the plurality of sections on first in, first out basis.

2. The apparatus of claim 1, data packet generation means, responsive to the reading means transferring a number of data packets to the plurality of destinations that is less than the plurality of destinations, for generating a number of dummy data packets equal to the difference between the plurality of destinations and number of data packets, wherein the dummy data packets are sent to destinations within the plurality of destinations unassigned by the address means.

3. The apparatus of claim 1, wherein the location information identifying a location of a data packet within the first storage means includes an identification of an input within the plurality of inputs from which the data packet was received to identify a portion within the plurality of portions in which the data packet is located and an identification of a segment within the plurality of segments within the portion identified in which the data packet is located.

4. The apparatus of claim 1 further comprising:

a concentrator having an input connected to the first storage for receiving data packets transferred by the reading means; and a batcher sorting network having a first input for receiving data packets from the first storage means, a second input for receiving data packets from the data packet generation means, and a plurality of outputs, wherein each of the plurality of outputs is associated with a destination within the plurality of destinations, wherein the batcher sorting network sorts data packets based on destinations assigned to the data packets.

5. The apparatus of claim 1, wherein the plurality of portions in the first storage means is a plurality of input queues.

6. The apparatus of claim 1, wherein the plurality of sections within the second storage means is a plurality of output queues.

7. The apparatus of claim 6, wherein the plurality of sections within the second storage means further includes a plurality of sequencers connected to the plurality of output queues, wherein the sequencer manages data within the output queues on a first in, first out basis.

8. The apparatus of claim 1, wherein location information identifies the input at which a data packet was received and an address identifying a segment within the number of segments.

9. The apparatus of claim 1 further comprising:

priority means for identifying a priority for each data packet within the plurality of data packets;

wherein the reading means accesses each of the plurality of sections, first using an identification of the priority of each data packet and second, on a first in, first out basis.

10. The apparatus of claim 1, wherein the plurality of data packets is a plurality of cells.

11. The apparatus of claim 10, wherein the plurality of cells is a plurality of asynchronous transmission mode cells.

12. The apparatus of claim 1, wherein the apparatus is a satellite switch.

13. The apparatus of claim 1, wherein the apparatus is a terrestrial switch.

14. A switch comprising:
a plurality of input ports, wherein a plurality of data packets are received at the plurality of input ports, a plurality of port units, each port unit being connected to an input within the plurality of inputs and including:
a header parser register, the header parser register being connected to the plurality of input ports, where a data packet within the plurality of data packets received by the header parser register is examined to identify a header within the data packet, wherein the header includes an address for the data packet;
an address translation table, wherein the address translation table receives the address from the header parser and generates a new address for use within the switch and a destination output port;
a local header generator, the local header generator altering the header of the data packet for use within the switch, wherein the new address is placed within the header of the data packet and the destination output port is appended to as a local header to the data packet by the local header generator;
an input queue associated with an input within the plurality of inputs and having a plurality of locations for storing data packets, the input queue having a single input and having an output for each location within the plurality of locations, wherein the input queue stores data packets received at an input, wherein a data packet is stored in a location within the input queue associated with the input at which the data packet was received and each location has a pointer associated therewith;
a pointer unit containing a plurality of pointers, wherein each pointer within the plurality of pointers points to a location within the input queue and is associated with an input port, wherein the plurality of pointers are pointers to locations in which data packets are absent, and wherein a pointer within the plurality of pointers is removed from the pointer unit in response to a data packet being placed within the location of the input queue pointed to by the pointer;
a write control unit, the write control unit obtaining the pointer to a free portion of the input queue and storing the data packet within the free location in the input queue; and
a system controller including:
a plurality of output queues, wherein each of the plurality of output queues is associated with a destination output port and includes a first subqueue to store the location of a data packet within an input queue and a second subqueue to store the an input port number at which a data packet was received;
a plurality of output port decoders, each output port decoder within the plurality of output port decoders is associated with an input port within the plurality of input ports, wherein an output port decoder within the plurality of output port decoders, responsive to receiving a pointer to a location in the input queue containing a data packet and a destination output port for the data packet, sends an identification of the input port and the pointer to the location containing the data packet to an output queue, within the plurality of output queues, corresponding to the destination output port;
a read controller unit, wherein the read controller unit accesses the plurality of output queues and forms an array of input port numbers and an array of pointers, wherein the array of input port numbers and the array of pointers are used by the read controller unit to read data packets from the input queue;
a concentrator connected to the input queue the output for each location within the plurality of sections within the input queue, wherein data packets are selected for transfer from the buffer to the concentrator by the read controller unit; and
a batcher sorting network connected to the concentrator, wherein data packets received from the concentrator are sent to the destination output ports.

15. The switch of claim 14, wherein in response to the number of data packets being less than the plurality of data packets, means for discarding each data packet in excess of the number of data packets.

16. The switch of claim 14, wherein the number of data packets selected for transfer by the read controller unit to the concentrator is less than the number of destination output ports, and further comprising a dummy data packet generator connected to the batcher sorting network, wherein the dummy data packet generator creates a number of dummy data packets equal to the difference between the number of the destination output ports and the number of data packets selected, wherein the dummy data packets are sent to the destination output ports unassigned to the number of data packets.

17. The switch of claim 14, wherein each of the plurality of data packets is assigned a priority from a number of priorities and further comprising a plurality of servers, wherein each server is associated with one of the plurality of output queues and provides the read controller access to a location and an output port number of a data packet stored within an output queue based on a priority of the data packet compared to a priority of the data packet associated with the location and the output port number compared to a priority of other location and input port numbers stored within the output queue for others data packets.

18. The switch of claim 14, wherein the plurality of data packets is a plurality of cells.

19. The apparatus of claim 18, wherein the plurality of cells is a plurality of a synchronous transmission mode cells.

20. The switch of claim 14, wherein the switch is a satellite switch.

21. The switch of claim 14, wherein the switch is a terrestrial switch.

22. A method for routing a plurality of data packets, the method comprising:
receiving the plurality of data packets at a plurality of inputs;
associating routing information with each data packet of the plurality of data packets, wherein the routing information includes a location of the data packet within a first memory;
storing the plurality of data packets in the first memory in the location identified by the routing information;
storing the routing information in a second memory having a plurality of sections, wherein each section within the plurality of sections is associated with a destination, wherein routing information for each data packet is stored in a section associated with a destination for the data packet;

identifying a number of data packets for routing to the plurality of destinations by accessing the routing information for a data packet from each of the plurality of sections on a first in, first out basis; and transferring the number of data packets from the first memory to the plurality of destinations simultaneously in response to identifying the number of data packets.

23. The method for claim 22, wherein the first memory includes a plurality of portions, each portion within the plurality of portions being associated with an input within the plurality of inputs, wherein each portion of the plurality of portions has a plurality of segments for storing data packets, and wherein the step of storing the plurality of data packets in the first memory includes storing a data packet within the plurality of data packets within a segment within the plurality of segments in a portion of the memory associated with the input at which data packet was received.

24. The method of claim 23, wherein the information identifying the location a data packet includes an identification of a portion within the plurality of portions in which the cell was stored and an identification of the segment within the plurality of segments in which the cell is stored in the first memory.

25. The method of claim 22, wherein the second memory is a plurality of queues.

26. The method of claim 22, wherein the plurality of data packets is a plurality of cells.

27. The method of claim 26, wherein the plurality of cells is a plurality of a synchronous transmission mode cells.

28. The method of claim 22, wherein the method is performed in a satellite switch.

29. The method of claim 22, wherein the method is performed in a terrestrial switch.

30. A switch comprising:
a plurality of inputs, wherein data packets are received at the plurality of inputs;
input storage units connected to the plurality of inputs, the input storage unit having a plurality of sections in which each section within the plurality of sections is associated with an input within the plurality of inputs, wherein the plurality of data packets received at the plurality of inputs are stored within the plurality of sections based on the plurality of input at which the plurality of data packets were received; and
an address translator, the address translator assigning a destination to each of the plurality of data packets received at the plurality of inputs; and
an output storage unit having a plurality of sections, wherein each section within the plurality of sections in the output storage unit is associated with a destination within the plurality of destinations, wherein the output storage unit stores location information identifying locations of each data packet within the plurality of data packets stored within the input storage units; and
a read controller unit connected to the input storage unit, wherein the read controller unit reads locations of a number of data packets stored within the input storage unit from each of the plurality of sections and transfers the plurality of data packets to the plurality of destinations.

31. The switch of claim 30, wherein the plurality of sections within the input storage unit is a plurality of input queues.

32. The switch of claim 30, wherein the plurality of sections within the output storage unit is a plurality of output queues.

33. The switch of claim 32, wherein each of the plurality of output queues includes a first subqueue for storing a location of a data packet and a second subqueue for storing an identification of the input at which the data packet arrived.

34. The switch of claim 30, further comprising:
a write control unit connected to the input storage unit, wherein the write control unit stores the plurality of data packets within the input storage unit based on the plurality of inputs at which the plurality of data packets arrived.

35. The switch of claim 30 further comprising a dummy data packet generator, wherein the dummy date packet generator, responsive to the read controller transferring a number of data packets from the input storage unit that is less than the plurality of destinations, generates a selected number of dummy data packets equal to plurality of destinations minus the number data packets transferred from the input storage unit and sends the selected number of dummy data packets to destinations not associated with the number of data packets.

36. The switch of claim 30, wherein each data packet within the plurality of data packets has a priority within a plurality of priorities and wherein location information stored within the output storage unit for each of the plurality of data packets is associated with the priority for that data packet and further comprising a server unit, wherein the server unit selects location information from each of the plurality of sections within the output storage unit for access by the read controller based on a priority of the location information stored within the output storage unit.

37. The switch of claim 30, wherein the switch is a satellite switch.

38. The switch of claim 30, wherein the switch is a terrestrial switch.

39. The switch of claim 30, wherein the plurality of data packets contain multi-media data.

40. The switch of claim 30, wherein the plurality of data packets is a plurality of cells.

41. The switch of claim 40, wherein the plurality of cells is a plurality of a synchronous transmission cells.

42. A communication system comprising:
a plurality of switches, wherein at least one of the plurality of switches includes:
a plurality of inputs for receiving data packets;
first storage means for storing data packets received at the plurality of inputs, the storage means having a plurality of portions, wherein each portion within the plurality of portions is associated with an input within the plurality of inputs and contains a number of segments and wherein a data packet may be stored within each segment within the number of segments;
address translation means for assigning a destination from a plurality of destinations to each data packet received at the plurality of inputs;
second storage means having a plurality of sections, each section within the plurality of sections being associated with one of the plurality of destinations and having a plurality of segments, wherein the second storage means stores, in a section within the plurality of sections, location information identifying locations of the data packets within the plurality of sections associated with the destination assigned to the data packet in the first storage means; and
reading means for transferring data packets stored in the first storage means to the plurality of destinations using the information identifying the locations of the data packets, wherein the reading means accesses information in each of the plurality of sections first in, first out manner;

a plurality of communications links, wherein the plurality of switches are connected to each other by the plurality of communications links; and a plurality of communications devices located within different portions of the communications system, wherein data is sent from a first communications system within the plurality of communications devices to a second communications device within the plurality of communications devices using a portion of the plurality of switches and communications links.

43. The communication system of claim 42, wherein at least one of the plurality of switches is a satellite switch and at least one of the plurality of switches is a terrestrial switch.

* * * * *

UNITED STATES PATENT AND TRADEMARK OFFICE
CERTIFICATE OF CORRECTION

PATENT NO. : 5,870,396
DATED : Feb. 9, 1999
INVENTOR(S) : *Abu-Amara et al.*

It is certified that error appears in the above-identified patent and that said Letters Patent is hereby corrected as shown below:

In col. 14, line 10, please change "P," to -- $P_s$ --.

In col. 15, in the equation between lines 26-31, please replace:

$$"P_{w-1} = \left( \frac{1}{P\mu_{a/w-1}} \right) \times \sum_{i=1}^{W} (1-P)\mu_{i/w} \times P_w."$$

with:

$$-- \left(\frac{1}{P\mu_{a/w-1}}\right) x \Sigma_{i=1}^{W} (1-P)\mu_{i/w} x P_w --$$

In col. 17, line 42, please change "fall" to --full--.

In col. 18, line 12, please change "N/4(log₂N + (log₂N)²)" to:

$$-- \frac{N}{4}(\log_2 N + (\log_2 N)^2) --$$

Signed and Sealed this

Twenty-third Day of November, 1999

Attest:

Q. TODD DICKINSON

*Attesting Officer*     *Acting Commissioner of Patents and Trademarks*